US012769347B2

(12) United States Patent
Cho et al.

(10) Patent No.: US 12,769,347 B2
(45) Date of Patent: Oct. 20, 2026

(54) VOLTAGE REGULATOR, ELECTRONIC SYSTEM INCLUDING THE SAME, AND OPERATION METHOD THEREOF

(71) Applicant: SAMSUNG ELECTRONICS CO., LTD., Suwon-si (KR)

(72) Inventors: Sunghun Cho, Suwon-si (KR); Juri Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 18/733,152

(22) Filed: Jun. 4, 2024

(65) Prior Publication Data

US 2025/0123645 A1 Apr. 17, 2025

(30) Foreign Application Priority Data

Oct. 12, 2023 (KR) ........................ 10-2023-0136274

(51) Int. Cl.
*G05F 1/575* (2006.01)
*G05F 1/56* (2006.01)

(52) U.S. Cl.
CPC ................ *G05F 1/575* (2013.01); *G05F 1/56* (2013.01)

(58) Field of Classification Search
CPC ................................... G05F 1/575; G05F 1/56
See application file for complete search history.

(56) References Cited

U.S. PATENT DOCUMENTS 7,397,226 B1 7/2008 Mannama et al.
8,754,621 B2 6/2014 El-Nozahi
9,134,743 B2 9/2015 Bisson et al.
9,354,649 B2 * 5/2016 Ho .......................... G05F 1/618
9,577,508 B2 2/2017 Wang
10,175,706 B2 1/2019 Golara et al.
10,281,943 B1 * 5/2019 Ho .......................... G05F 1/575
2004/0140845 A1 7/2004 Eberlein
2022/0350356 A1 * 11/2022 D'Souza ............... H02M 3/156
2023/0200870 A1 * 6/2023 Treace ............... A61B 17/1604 606/280
2023/0409065 A1 * 12/2023 Feng .......................... G05F 1/59
2024/0162867 A1 * 5/2024 Chuang ................. H03F 3/2173

FOREIGN PATENT DOCUMENTS

KR 10-2019-0018424 A 2/2019

OTHER PUBLICATIONS

Kishan Joshi et al., A 5.6 μ A Wide Bandwidth, High Power Supply Rejection Linear Low-Dropout Regulator With 68 dB of PSR Up to 2 MHz, IEEE Journal of Solid-State Circuits, 2151-2160, Mar. 16, 2020.

* cited by examiner

*Primary Examiner* — Lakaisha Jackson

(74) *Attorney, Agent, or Firm* — Morgan, Lewis & Bockius LLP

(57) ABSTRACT

A voltage regulator configured to generate an output voltage includes a comparison unit configured to generate a second voltage based on a reference voltage and a first voltage generated by a feedback of the output voltage, a power noise replica buffer unit configured to generate a third voltage including a power noise copied based on the second voltage, and a pass transistor configured to generate the output voltage in response to the third voltage.

20 Claims, 13 Drawing Sheets

VOLTAGE REGULATOR, ELECTRONIC SYSTEM INCLUDING THE SAME, AND OPERATION METHOD THEREOF

CROSS-REFERENCE TO RELATED APPLICATIONS

This application claims priority under 35 U.S.C. § 119 to Korean Patent Application No. 10-2023-0136274, filed on Oct. 12, 2023, the disclosure of which is incorporated by reference herein in its entirety.

TECHNICAL FIELD

Embodiments of the present disclosure relate to an element for power management of a device, and more particularly, to a voltage regulator, an electronic system including the same, and an operation method thereof.

DISCUSSION OF RELATED ART

A power management integrated circuit (PMIC) may generate a supply voltage to provide power to electronic components. The level of the supply voltage may be determined based on the performance of each electronic component. The power management integrated circuit may include a regulator that generates various levels of supply power. The regulator refers to a circuit which converts a power input from outside of the PMIC into a direct current power utilized by the system by using power switches. The regulator may include a DC-DC converter for stepping up or stepping down the input DC power as a power regulator. The regulator may be classified as a linear regulator or a switch regulator depending on the manner in which it operates.

SUMMARY

Embodiments of the present disclosure provide a voltage regulator having a simple structure while supporting a high power supply rejection ratio (PSRR) characteristic.

According to an embodiment, a voltage regulator which generates an output voltage includes a comparison unit that generates a second voltage, based on a reference voltage and a first voltage generated by a feedback of the output voltage, a power noise replica buffer unit that generates a third voltage including a power noise copied based on the second voltage, and a pass transistor that generates the output voltage in response to the third voltage. The power noise replica buffer unit includes a 0-th transistor connected between a ground node and a 0-th node and that operates in response to the second voltage, a first transistor connected between the 0-th node and a power node and including a gate node connected to a second node, a high-pass filter connected between the second node and a third node, a second transistor connected between the power node and a first node connected to the third node and including a gate node connected to the third node, and a current source connected between the first node and the ground node, where the power noise replica buffer unit provides the third voltage through the 0-th node.

According to an embodiment, a voltage regulator which generates an output voltage includes a comparison unit that generates a second voltage, based on a reference voltage and a first voltage generated by a feedback of the output voltage, a power noise replica buffer unit that generates a bias signal including a noise of a power supply voltage, a first buffer that generates a third voltage, based on the bias signal and the second voltage, a second buffer that buffers a fourth voltage, based on the third voltage, and a pass transistor configured to generate the output voltage in response to the fourth voltage.

According to an embodiment, an operation method of a voltage regulator includes generating a first voltage by comparing a reference voltage and a feedback voltage of an output voltage, generating a second voltage, based on the first voltage and a bias signal including a high-frequency component of a power supply voltage of the voltage regulator, and generating the output voltage, based on the second voltage.

According to an embodiment, an electronic system includes a plurality of electronic devices, and a power management integrated circuit including a voltage regulator that provides an output voltage to the electronic devices. The voltage regulator includes a comparison unit that generates a second voltage, based on a reference voltage and a first voltage which is a feedback voltage of the output voltage, and a power noise replica unit that generates a bias signal, based on a high-frequency component of a power supply voltage.

BRIEF DESCRIPTION OF THE DRAWINGS

The above and other objects and features of the present disclosure will become more apparent by describing in detail embodiments thereof with reference to the accompanying drawings.

DETAILED DESCRIPTION

Figure 1:
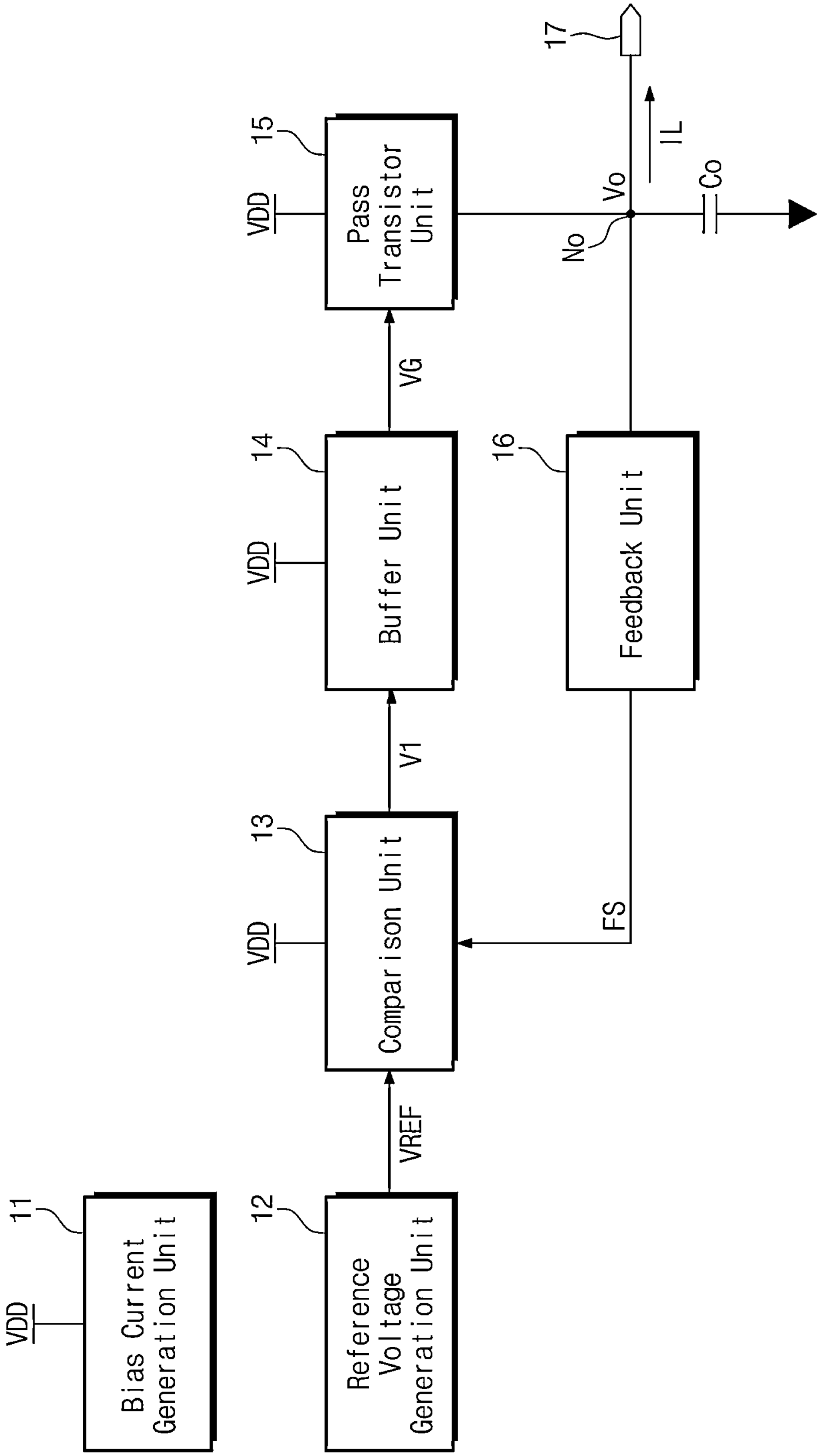
FIG. 1 is a block diagram illustrating a voltage regulator according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a voltage regulator according to an embodiment of the present disclosure.

Referring to FIG. 1, a voltage regulator 10 (also referred to as a voltage regulator circuit) may include a bias current generation unit 11 (also referred to as a bias current generation circuit), a reference voltage generation unit 12 (also referred to as a reference voltage generation circuit), a comparison unit 13 (also referred to as a comparison circuit), a buffer unit 14 (also referred to as a buffer circuit), a pass transistor unit 15 (also referred to as a pass transistor circuit), and a feedback unit 16 (also referred to as a feedback circuit). A power supply voltage VDD provided to each circuit of FIG. 1 may be a voltage supplied from an external power source or may be a voltage which a DC-DC converter generates based on the voltage of the external power source. In an embodiment, the external power source may include a power storage device such as a battery or a capacitor.

The bias current generation unit 11 may generate a bias current utilized for the operation of the voltage regulator 10. In an embodiment, the bias current generation unit 11 may generate a current which is not affected by an external environment (e.g., a temperature). The bias current generation unit 11 may provide the bias current to various circuits in the voltage regulator 10, for example, the comparison unit 13 or the buffer unit 14.

The reference voltage generation unit 12 may generate a reference voltage VREF which is used as a reference in the process of generating an output voltage Vo. In an embodiment, the reference voltage generation unit 12 may be implemented with one of various voltage generators. For example, the reference voltage generation unit 12 may include a bandgap reference voltage generator. The reference voltage generation unit 12 may provide the reference voltage VREF to the comparison unit 13.

The comparison unit 13 may compensate for a change in the output voltage Vo. In an embodiment, the comparison unit 13 may be provided with the power supply voltage VDD and may compensate for the change in the output voltage Vo. The comparison unit 13 may receive the reference voltage VREF and a feedback signal FS as inputs and may generate a first voltage V1 as an output based on a result of comparing the reference voltage VREF and a voltage of the feedback signal FS.

The buffer unit 14 may receive the first voltage V1 and may provide a gate voltage VG to the pass transistor unit 15. The buffer unit 14 may operate based on the power supply voltage VDD thus provided and may be provided with the bias current generated by the bias current generation unit 11. The buffer unit 14 may buffer the first voltage V1 to generate the gate voltage VG. The gate voltage VG may include a power noise copied based on the first voltage V1.

The pass transistor unit 15 may be provided with the gate voltage VG and may generate the output voltage Vo and a load current IL. In an embodiment, the pass transistor unit 15 may include a metal-oxide-semiconductor field-effect transistor (MOSFET) (hereinafter referred to as a "MOS transistor"). For example, the pass transistor unit 15 may include a p-type MOSFET (hereinafter referred to as a "PMOS transistor") which is connected between the power supply voltage VDD and an output node No and generates an output in response to the gate voltage VG. In an embodiment, a first end of the pass transistor unit 15 may be connected to the power supply voltage VDD, and a second end thereof may be connected to various circuits. For example, the second end of the pass transistor unit 15 may be connected to an output capacitor Co, the feedback unit 16, and a load device 17. The output voltage Vo and the load current IL generated by the pass transistor unit 15 may be provided to the load device 17.

The feedback unit 16 may sense the output voltage Vo and may provide feedback to the comparison unit 13. The feedback unit 16 may receive the output voltage Vo and may generate the feedback signal FS depending on a given ratio. The feedback unit 16 may provide the feedback signal FS to one of inputs of the comparison unit 13.

Figure 2:
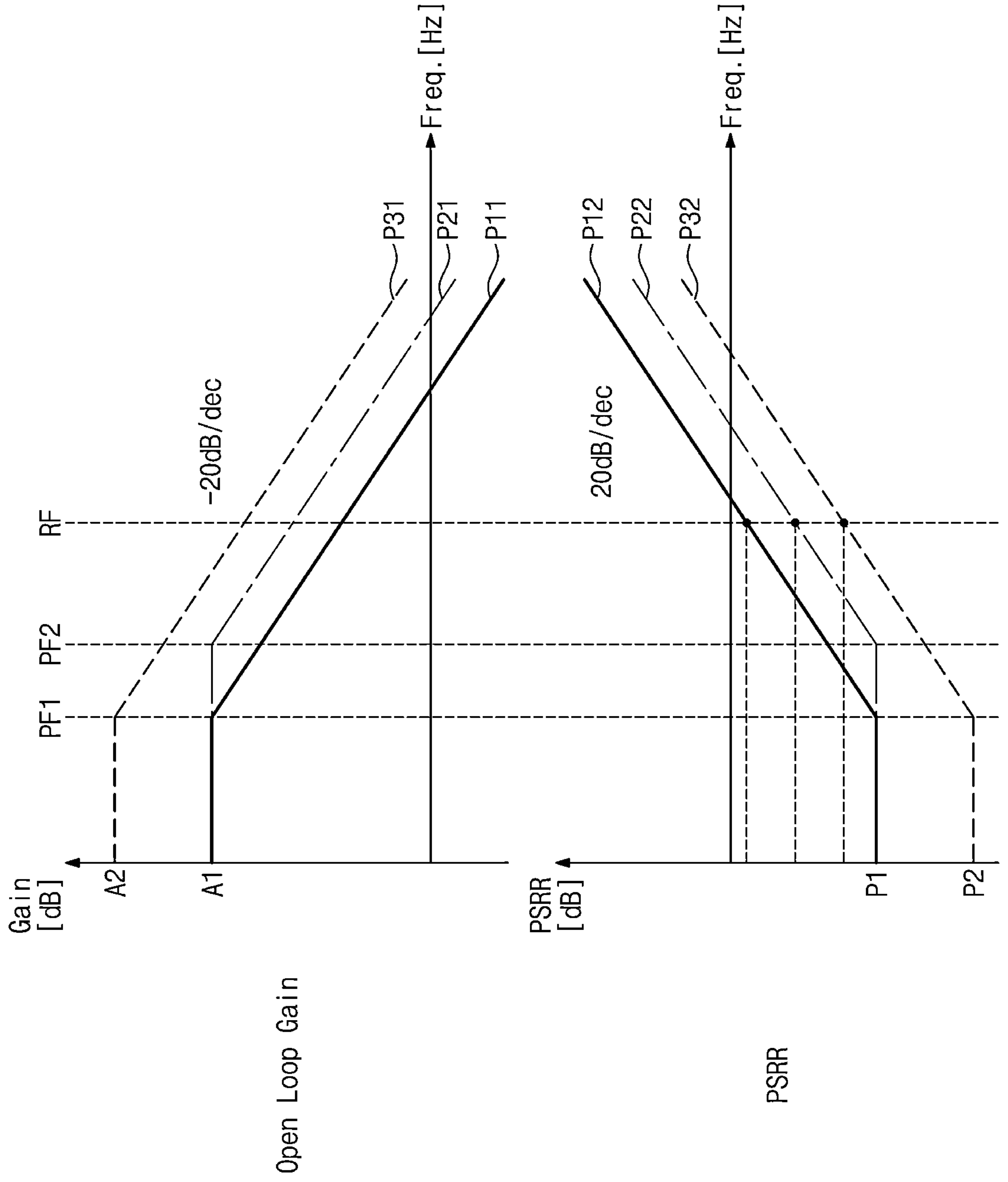
FIG. 2 is a bode plot illustrating an open-loop gain of a voltage regulator of FIG. 1 and a response of a frequency spectrum of a power supply rejection ratio (PSRR) in a logarithm scale.

FIG. 2 illustrates graphs of a frequency response characteristic of a voltage regulator of FIG. 2.

In an embodiment, the top graph of FIG. 2, which is a bode plot, the horizontal axis represents a frequency, and the vertical axis represents an open loop gain of a voltage regulator in a log scale. In addition, the bottom graph of FIG. 2, which is a bode plot, the horizontal axis represents a frequency, and the vertical axis represents a power supply rejection ratio (PSRR) of a voltage regulator in a log scale. The open loop gain may mean the magnitude of a small signal gain of the output voltage Vo relative to the reference voltage VREF in a case in which the feedback unit 16 is removed from the voltage regulator 10. The PSRR may mean how much the output voltage Vo changes depending on the power supply voltage VDD.

Referring to FIG. 2, three open loop gains are illustrated. A first open loop gain P11 may have a first gain A1 as a direct current (DC) gain and may decrease at a rate of about 20 dB/dec while passing through a first pole frequency PF1. A second open loop gain P21 may have the first gain A1 as a DC gain and may decrease at a rate of about 20 dB/dec while passing through a second pole frequency PF2. Herein, the second pole frequency PF2 may be higher than the first pole frequency PF1. A third open loop gain P31 may have a second gain A2 greater than the first gain A1 as a DC gain and may decrease at a rate of about 20 dB/dec after the first pole frequency PF1. The pole frequencies PF1 and PF2 may be formed depending on the output capacitor Co of FIG. 1, an output impedance based on the output node No of FIG. 1, and a characteristic of the reference voltage VREF.

Referring to FIG. 2, three PSRRs respectively corresponding to the three open loop gains are illustrated. A first PSRR P12 may have a first ratio P1 as a PSRR of a DC point and may increase at a rate of about 20 dB/dec from the first pole frequency PF1. A second PSRR P22 may have the first ratio P1 as a PSRR of a DC point and may increase at a rate of about 20 dB/dec from the second pole frequency PF2. A third PSRR P32 may have a second ratio P2 as a PSRR of a DC point and may increase at a rate of about 20 dB/dec from the first pole frequency PF1. Herein, the first ratio P1 and the second ratio P2 may have a negative value, and the absolute value of the second ratio P2 may be greater than the absolute value of the first ratio P1.

In a case of comparing the three PSRRs on a reference frequency (RF) point, the absolute value of the third PSRR P32 may be the greatest, the absolute value of the first PSRR P12 may be the smallest, and the absolute value of the second PSRR P22 may be smaller than the absolute value of the third PSRR P32 and greater than the absolute value of the first PSRR P12. That is, as the DC gain increases, the absolute value of the PSRR may increase (or the PSRR characteristic may become better). Alternatively, as the pole frequency becomes higher, the absolute value of the PSRR may increase (or the PSRR characteristic may become better).

As understood from FIG. 2, the PSRR performance of the voltage regulator may be improved 1) by increasing the DC gain of the output voltage or 2) by shifting a location of the pole frequency to a higher frequency. However, the above method may have difficulty in increasing a driving current of a voltage regulator or improving the stability of a loop formed together with a feedback circuit. Also, even though the above method is applied to a voltage regulator that supplies a high-frequency power, the effect of improving the PSRR may be minimal or reduced. Accordingly, a structure, a device, and an operation capable of improving the PSRR even though a voltage regulator supplies an output power of a high frequency will be described in detail with reference to the following drawings.

Below, for convenience of explanation, a voltage regulator 100 according to embodiments of the present disclosure will be described as being a low dropout regulator. However, the present disclosure is not limited thereto. It should be understood that the technical idea described in detail regarding improving the PSRR may be applied to various semiconductor elements, semiconductor circuits, semiconductor devices, or electronic devices.

Figure 3:
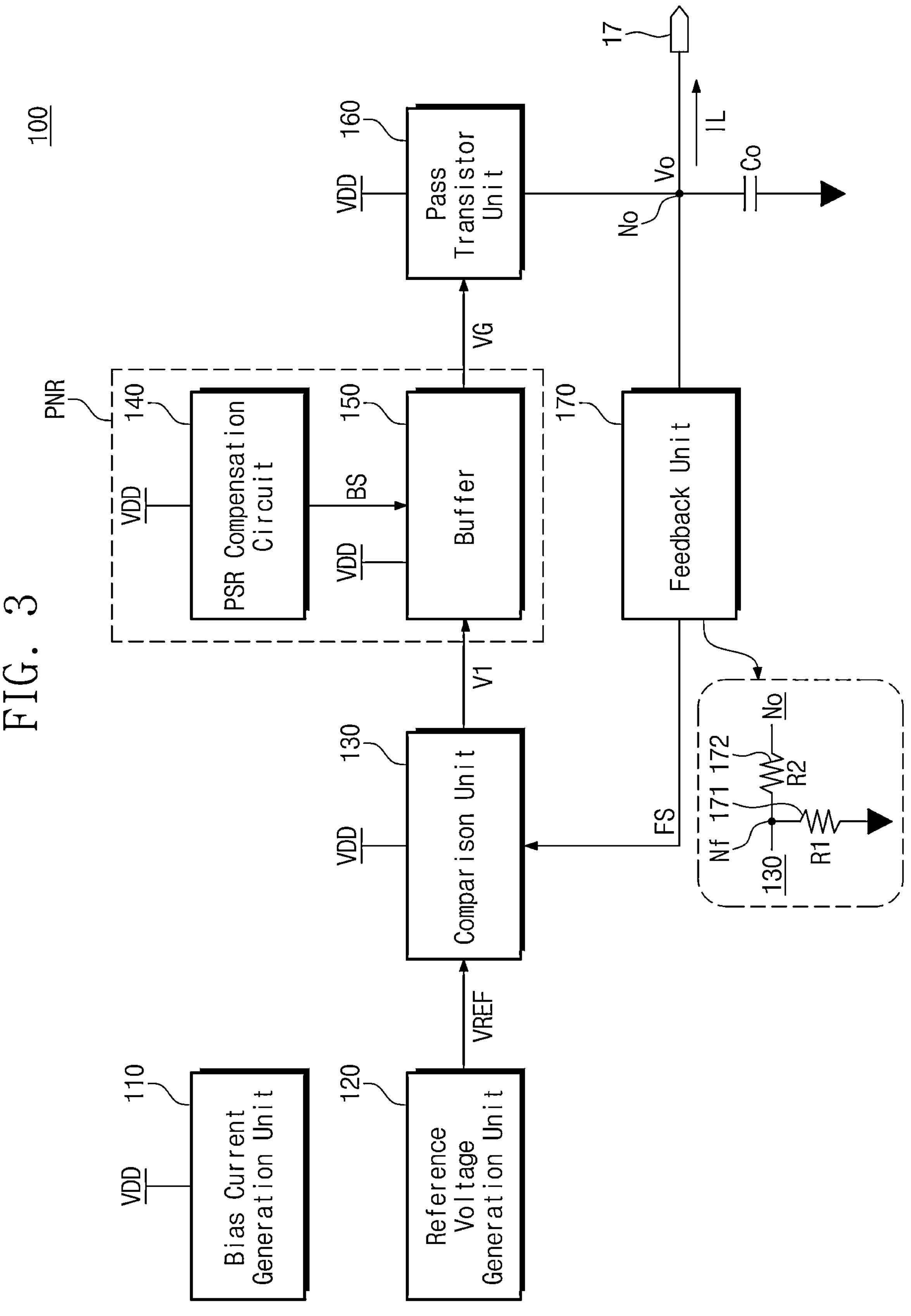
FIG. 3 is a block diagram illustrating a voltage regulator according to an embodiment of the present disclosure.

FIG. 3 is a block diagram illustrating the voltage regulator 100 according to an embodiment of the present disclosure.

Referring to FIG. 3, the voltage regulator 100 (also referred to as a voltage regulator circuit) may include a bias current generation unit 110 (also referred to as a bias current generation circuit), a reference voltage generation unit 120 (also referred to as a reference voltage generation circuit), a comparison unit 130 (also referred to as a comparison circuit), a power noise replica buffer unit PNR (also referred to as a power noise replica buffer circuit), a pass transistor unit 160 (also referred to as a pass transistor circuit), and a feedback unit 170 (also referred to as a feedback circuit). The power noise replica buffer unit PNR may include a power supply rejection (PSR) compensation circuit 140 and a buffer 150 (also referred to as a buffer circuit). A structure and an operation of the voltage regulator 100 according to an embodiment of the present disclosure will be described in detail with reference to FIG. 3.

The bias current generation unit 110 may generate a bias current utilized for the operation of the voltage regulator 100. In an embodiment, the bias current generation unit 110 may be the same as or similar to the bias current generation unit 11 of FIG. 1. An example in which the bias current generation unit 110 is included in the voltage regulator 100 is illustrated in FIG. 3, but the present disclosure is not limited thereto. For example, in an embodiment, the bias current generation unit 110 may be disposed outside of the voltage regulator 100. The bias current generation unit 110 will be described in detail with reference to FIG. 5.

The reference voltage generation unit 120 may generate the reference voltage VREF, which is used as a reference in the process of generating an output voltage of the voltage regulator 100. In an embodiment, the reference voltage generation unit 120 may be the same as or similar to the reference voltage generation unit 12 of FIG. 1. An example in which the reference voltage generation unit 120 is placed inside the voltage regulator 100 is illustrated in FIG. 3. However, the present disclosure is not limited thereto. For example, in an embodiment, the reference voltage generation unit 120 may be disposed outside of the voltage regulator 100.

The comparison unit 130 may receive the feedback of the output voltage Vo and may apply the feedback to the generation of the output voltage Vo. The comparison unit 130 may operate based on the power supply voltage VDD. In an embodiment, the comparison unit 130 may generate the first voltage V1 based on the comparison of the reference voltage VREF and the feedback signal FS. For example, the comparison unit 130 may include an operational amplifier (OP-AMP) which outputs the first voltage V1 by using the reference voltage VREF as a non-inverting input and the feedback signal FS as an inverting input.

The above disclosure is provided as an example, and the present disclosure is not limited thereto. For example, a circuit(s) capable of comparing the reference voltage VREF and the feedback signal FS (e.g., amplifying a difference between the reference voltage VREF and the feedback signal FS) and outputting the first voltage V1 is included in the comparison unit 130 may be provided according to embodiments of the present disclosure. In the above example, the feedback signal FS is described as being a voltage signal. However, the present disclosure is not limited thereto. For example, the feedback signal FS may be in the form of a current according to embodiments of the present disclosure.

The PSR compensation circuit 140 may extract specific signals from the power supply voltage VDD. For example, the specific signal may include at least one or more of a low-frequency component of the power supply voltage VDD, a high-frequency component of the power supply voltage VDD, or a noise component of the power supply voltage VDD. In an embodiment, the PSR compensation circuit 140 may extract the noise component of the power supply voltage VDD. For example, the PSR compensation circuit 140 may extract noise components such as a ripple noise and a thermal noise of the power supply voltage VDD. The PSR compensation circuit 140 may provide the extracted noise component to the buffer 150 in the form of a bias signal BS. A structure and an operation of the PSR compensation circuit 140 will be described in detail with reference to FIGS. 6, 7, and 8.

The buffer 150 may generate the gate voltage VG to be provided to the pass transistor unit 160 from the first voltage V1. In an embodiment, the buffer 150 may generate the gate voltage VG based on the first voltage V1 and the bias signal BS. For example, the buffer 150 may generate the gate voltage VG by buffering the first voltage V1 based on the bias signal BS. For example, the buffer 150 may generate the gate voltage VG including a power noise copied based on the first voltage V1. The buffer 150 may provide the pass transistor unit 160 with the gate voltage VG thus generated. A structure and an operation of the buffer 150 will be described in detail with reference to FIGS. 7 and 8.

The pass transistor unit 160 may receive the gate voltage VG to generate the output voltage Vo and the load current IL. In an embodiment, the pass transistor unit 160 may include a circuit capable of generating the output voltage Vo and the load current IL in response to the gate voltage VG. For example, the pass transistor unit 160 may include a PMOS transistor which is connected between the output node No and the power supply voltage VDD and operates in response to the gate voltage VG. In this case, the pass transistor unit 160 may include a PMOS transistor of a common source (CS) structure where the gate voltage VG is used as an input.

The above description is provided as an example and is not intended to limit the scope and spirit of the present disclosure. For example, according to embodiments of the present disclosure, the pass transistor unit 160 may include an element capable of generating the output voltage Vo or the load current IL in response to the gate voltage VG or a circuit capable of generating the output voltage Vo or the load current IL in response to the gate voltage VG (or receiving the gate voltage VG to generate the output voltage Vo or the load current IL). For example, in an embodiment, the pass transistor unit 160 may include an n-type metal-oxide-semiconductor field-effect transistor (N-type MOS-FET) (hereinafter referred to as an "NMOS transistor") capable of generating the output voltage Vo or the load current IL in response to the gate voltage VG. For example, in an embodiment, the pass transistor unit 160 may include a circuit which is implemented with a plurality of MOS transistors capable of generating the output voltage Vo or the load current IL in response to the gate voltage VG.

The feedback unit 170 may generate the feedback of the output voltage Vo. The feedback unit 170 may generate the feedback signal FS from the output voltage Vo so as to be provided to the comparison unit 130. In an embodiment, the feedback signal FS may be a voltage signal. For example, the feedback unit 170 may generate a feedback voltage from the output voltage Vo and may provide the feedback voltage to the inverting input of the comparison unit 130.

In an embodiment, the feedback unit 170 may include a circuit which generates the feedback signal FS whose magnitude is 1/N (N being a real number of 1 or more) of the output voltage Vo. For example, referring to FIG. 3, the feedback unit 170 may include a first resistor 171 (whose resistance value is "R1") connected between a ground node and a feedback node Nf and a second resistor 172 (whose resistance value is "R2") connected between the output node No and the feedback node Nf. In this case, the feedback signal FS which is provided to the comparison unit 130 through the feedback node Nf may have a value obtained by multiplying the output voltage Vo and a value of (R1/(R1+R2)) together. The detailed structure of the feedback unit 170 described above is provided as an example, and the present disclosure is not limited thereto.

The output capacitor Co may be connected between the output node No and the ground node. In an embodiment, the output capacitor Co may determine the characteristic of the output voltage Vo. For example, the capacitance of the output capacitor Co may determine a gain and a frequency characteristic of the output voltage Vo together with the output impedance of the feedback unit 170 and the load device 17.

Figure 4:
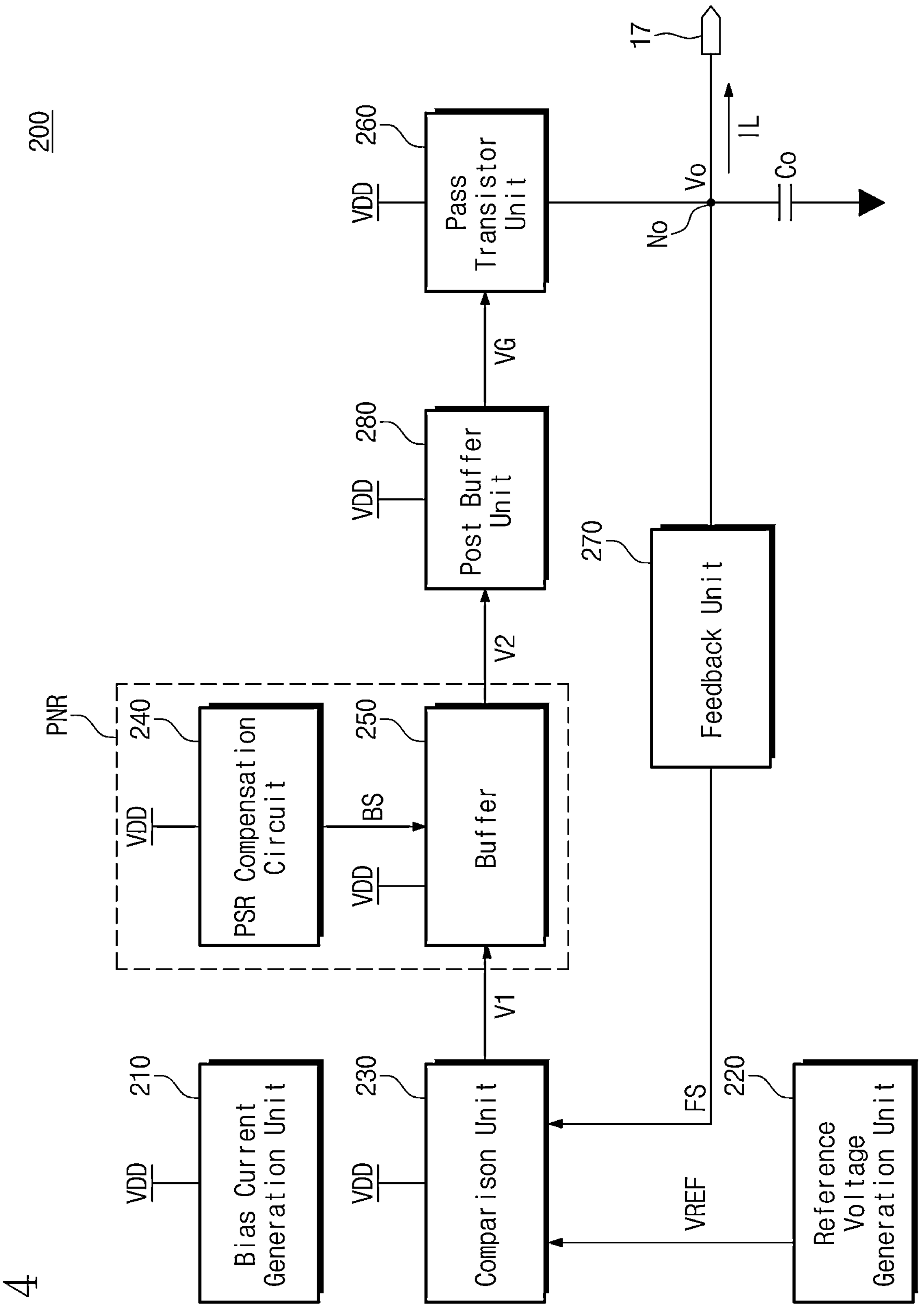
FIG. 4 is a block diagram illustrating a voltage regulator according to an embodiment of the present disclosure.

FIG. 4 is a block diagram illustrating a voltage regulator 200 according to an embodiment of the present disclosure.

Referring to FIG. 4, the voltage regulator 200 (also referred to as a voltage regulator circuit) may include a bias current generation unit 210 (also referred to as a bias current generation circuit), a reference voltage generation unit 220 (also referred to as a reference voltage generation circuit), a comparison unit 230 (also referred to as a comparison circuit), the power noise replica buffer unit PNR (also referred to as a power noise replica buffer circuit), a pass transistor unit 260 (also referred to as a pass transistor circuit), a feedback unit 270 (also referred to as a feedback circuit), a post buffer unit 280 (also referred to as a post buffer circuit), and the output capacitor Co. The power noise replica buffer unit PNR may include a PSR compensation circuit 240 and a buffer 250 (also referred to as a buffer circuit). In an embodiment, like the voltage regulator 100 of FIG. 3, the voltage regulator 200 may generate the first voltage V1 through the comparison unit 230, may buffer the first voltage V1 through the power noise replica buffer unit PNR, and may generate the output voltage Vo and the load current IL through the pass transistor unit 260. Below, an operation of the voltage regulator 200 in which the post buffer unit 280 is included will be described in detail.

Like the bias current generation unit 110 of FIG. 3, the bias current generation unit 210 may generate a bias current utilized for the operation of the voltage regulator 200. Like the reference voltage generation unit 120 of FIG. 3, the reference voltage generation unit 220 may generate the reference voltage VREF to be provided to the comparison unit 230. Like FIG. 3, according to embodiments of the present disclosure, the bias current generation unit 210 or the reference voltage generation unit 220 may be disposed outside of the voltage regulator 200.

The PSR compensation circuit 240 may operate in the same manner as the PSR compensation circuit 140 of FIG. 3. In an embodiment, the PSR compensation circuit 240 may extract a specific component of the power supply voltage VDD. For example, the PSR compensation circuit 240 may extract a noise component of the power supply voltage VDD. The PSR compensation circuit 240 may provide the bias signal BS including the extracted specific component to the buffer 250. For example, the PSR compensation circuit 240 may provide the buffer 250 with the bias signal BS including the noise component of the power supply voltage VDD. Like the PSR compensation circuit 140 of FIG. 3, the above disclosure is provided as an example, and the present disclosure is not limited thereto.

The buffer 250 may generate a second voltage V2 based on the first voltage V1 and the bias signal BS. For example, the buffer 250 may generate the second voltage V2 by buffering the first voltage V1 based on the bias signal BS. The buffer 250 may provide the second voltage V2 to the post buffer unit 280. The remaining operation(s) of the buffer 250 may be the same as or similar to that of the buffer 150 of FIG. 3. A structure of the buffer 250 will be described in detail with reference to FIGS. 7 and 8.

The pass transistor unit 260 may generate the output voltage Vo and the load current IL in response to the gate voltage VG received from the post buffer unit 280. In an embodiment, the pass transistor unit 260 may include a PMOS transistor. For example, the pass transistor unit 260 may include a PMOS transistor which is connected between the power supply voltage VDD and the output node No and operates in response to the gate voltage VG. The above description is provided as an example and is not intended to limit the scope and spirit of the present disclosure. For example, according to embodiments of the present disclosure, the pass transistor unit 260 may include an element capable of generating the output voltage Vo or the load current IL in response to the gate voltage VG or a circuit capable of generating the output voltage Vo or the load current IL in response to the gate voltage VG (or receiving the gate voltage VG to generate the output voltage Vo or the load current IL).

The post buffer unit 280 may generate the gate voltage VG based on the second voltage V2. For example, the post buffer unit 280 may buffer the second voltage V2 to generate the gate voltage VG. In an embodiment, the post buffer unit 280 may provide the separation of the power noise replica buffer unit PNR from the pass transistor unit 260 and may reduce the mutual influence between the power noise replica buffer unit PNR and the pass transistor unit 260. For example, even though the size of the pass transistor unit 260 (e.g., the width/length ratio of the MOSFET) changes due to the change in accordance with the level of the output voltage Vo, without separate design modification of the power noise replica buffer unit PNR, the post buffer unit 280 may allow the voltage regulator 200 to maintain the same PSRR performance based on the change in the sizes of a 0-th MOSFET M0 and a first MOSFET M1 to be described with reference to FIG. 8.

The voltage regulator 100 of FIG. 3 and the voltage regulator 200 of FIG. 4 may have a simpler structure while still providing high PSRR performance. Because the voltage regulator 100 or 200 has a structure in which an auxiliary amplifier is not included, it may be possible to design the voltage regulator 100 or 200 more easily, to reduce the circuit area of the voltage regulator 100 or 200, and to reduce costs of manufacturing the voltage regulator 100 or 200.

The voltage regulator 100 or 200 according to an embodiment of the present disclosure may provide improved PSRR performance in a high-frequency range. Also, the voltage regulator 100 or 200 may provide an appropriate output voltage Vo and an appropriate load current IL to the load device 17 because the voltage regulator 100 or 200 has a characteristic of improving PSRR performance without the degradation of a load transient response characteristic.

The voltage regulator 200 of FIG. 4 may have a structure in which the post buffer unit 280 is included, and thus may make it possible to change a pass transistor more easily than the conventional voltage regulator. When a pass transistor is changed, the conventional voltage regulator undergoes a considerable design change with regard to a circuit for improving PSRR performance. However, even though the size of a transistor included in the pass transistor unit 260 changes as the output voltage Vo or the load current IL increases (e.g., even though the size W/L of the transistor increases or a plurality of transistors connected in parallel between the output node No and the power supply voltage VDD are included or added), the voltage regulator 200 may more easily cope with PSRR performance utilized by the load device 17 without a design change of the power noise replica buffer unit PNR (or through a minimal or reduced design change). This may mean that costs to change the design of the voltage regulator are reduced. Below, structures of the PSR compensation circuit 140 or 240, the power noise replica buffer unit PNR, and the bias current generation unit 110 or 210 of FIG. 3 or 4 will be described in detail.

Figure 5:
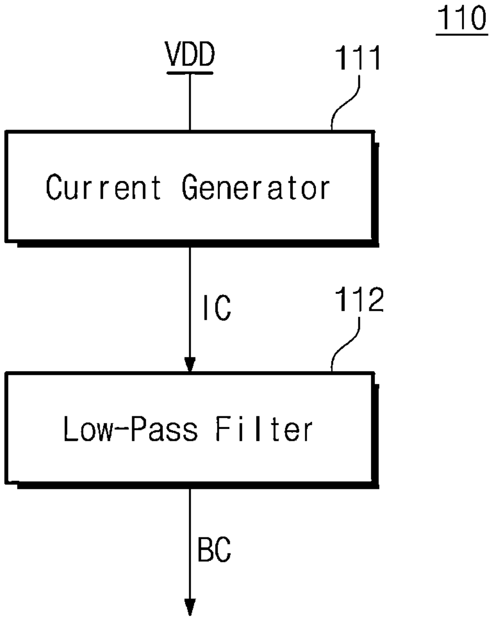
FIG. 5 is a block diagram illustrating a bias current generation unit of FIGS. 3 and 4 in detail, according to an embodiment of the present disclosure.

FIG. 5 is a block diagram illustrating the bias current generation unit 110 of FIG. 3 and the bias current generation unit 210 of FIG. 4 in detail, according to an embodiment of the present disclosure.

Although the bias current generation unit 110 of FIG. 3 is illustrated in FIG. 5, it should be understood that the bias current generation unit 210 of FIG. 4 may also be the same as the bias current generation unit 110. Referring to FIG. 5, the bias current generation unit 110 (also referred to as a bias current generation circuit) may include a current generator 111 (also referred to as a current generator circuit) and a low-pass filter 112 (also referred to as a low-pass filter circuit). The bias current generation unit 110 according to an embodiment of the present disclosure will be described in detail with reference to FIG. 5.

The current generator 111 may generate an initial current IC based on the power supply voltage VDD. In an embodiment, the current generator 111 may generate the initial current IC, which is not affected by an external environment. For example, the current generator 111 may generate the initial current IC with a uniform magnitude without the influence of a temperature change. In an embodiment, the current generator 111 may provide the initial current IC to the low-pass filter 112.

The low-pass filter 112 may filter a high-frequency component of the initial current IC. In an embodiment, the low-pass filter 112 may remove a noise included in the high-frequency component of the initial current IC. For example, the low-pass filter 112 may remove the thermal noise of the initial current IC or the noise component of the power supply voltage VDD. The low-pass filter 112 may filter the high-frequency component of the initial current IC to generate a bias current BC. In an embodiment, the low-pass filter 112 may provide the bias current BC to internal circuits of the voltage regulator 100 or 200. For example, the low-pass filter 112 may provide the bias current BC to the buffer 150.

Figure 6:
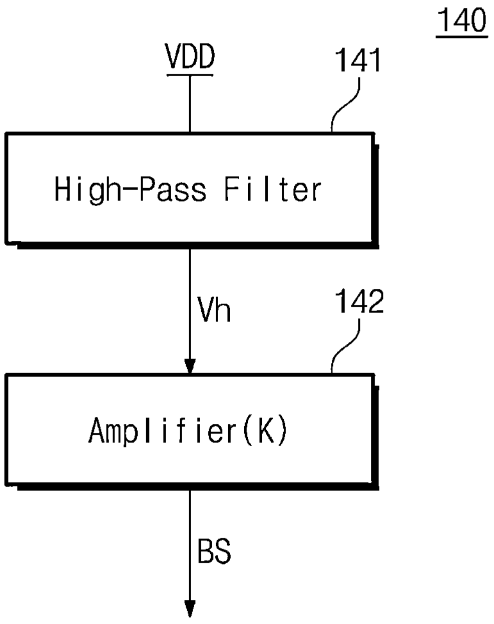
FIG. 6 is a block diagram of a power supply rejection (PSR) compensation circuit of FIG. 3 in detail, according to an embodiment of the present disclosure.

FIG. 6 is a block diagram of the PSR compensation circuit 140 of FIG. 3 in detail, according to an embodiment of the present disclosure.

Although the PSR compensation circuit 140 of FIG. 3 is illustrated in FIG. 6, the present disclosure is not limited thereto. For example, the PSR compensation circuit 240 may also be implemented to be the same as the PSR compensation circuit 140. Referring to FIG. 6, the PSR compensation circuit 140 may include a high-pass filter 141 (also referred to as a high-pass filter circuit) and an amplifier 142 (also referred to as an amplifier circuit). The PSR compensation circuit 140 according to an embodiment of the present disclosure will be described in detail with reference to FIG. 6.

The high-pass filter 141 may filter a low-frequency component of the power supply voltage VDD. In an embodiment, the high-pass filter 141 may remove a noise included in the low-frequency component of the power supply voltage VDD. For example, the high-pass filter 141 may extract the noise component of the power supply voltage VDD by passing a signal of an arbitrary frequency or higher. In an embodiment, the high-pass filter 141 may generate a high-pass voltage Vh so as to be provided to the amplifier 142. An example of the high-pass filter 141 will be described in detail with reference to FIG. 8.

The amplifier 142 may amplify the high-pass voltage Vh. In an embodiment, the amplifier 142 may amplify the high-pass voltage Vh at a given ratio. For example, the amplifier 142 may amplify the high-pass voltage Vh as much as k times (k being a positive integer). The amplifier 142 may amplify the high-pass voltage Vh to generate the bias signal BS. The amplifier 142 may provide the bias signal BS to the buffer 150 or 250. An example of the amplifier 142 will be described in detail with reference to FIG. 8.

Figure 7:
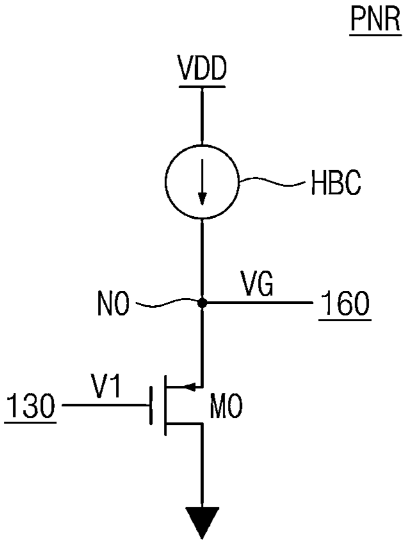
FIG. 7 is a circuit diagram illustrating a power noise replica buffer unit including a PSRR compensation circuit and a buffer of FIGS. 3 and 4, according to an embodiment of the present disclosure.

FIG. 7 is a circuit diagram illustrating a circuit of the power noise replica buffer unit PNR of FIGS. 3 and 4, according to an embodiment of the present disclosure.

Referring to FIG. 7, the power noise replica buffer unit PNR may include a high-band bias current source HBC and the 0-th metal-oxide-semiconductor field-effect transistor (MOSFET) M0. The power noise replica buffer unit PNR of FIG. 3, which receives the first voltage V1 to generate the gate voltage VG, is illustrated in FIG. 7, but may be identically applied to the power noise replica buffer unit PNR of FIG. 4, which receives the first voltage V1 to generate the second voltage V2. An operation of the power noise replica buffer unit PNR according to an embodiment of the present disclosure will be described in detail with reference to FIG. 7.

The high-band bias current source HBC may be connected between the power supply voltage VDD and a 0-th node N0. The high-band bias current source HBC may provide the high-frequency component of the power supply voltage VDD to the 0-th MOSFET M0. For example, the high-band bias current source HBC may provide the high-frequency component (e.g., noise component) of the power supply voltage VDD to the 0-th MOSFET M0 in the form of a bias current. In an embodiment, the magnitude of the current which the high-band bias current source HBC generates may be subordinate to the current that the bias current generation unit 110 of FIG. 3 or the bias current generation unit 210 of FIG. 4 generates, but the present disclosure is not limited thereto.

In an embodiment, the high-band bias current source HBC may provide a signal obtained by amplifying the high-frequency component of the power supply voltage VDD to the 0-th MOSFET M0 in the form of a bias current. For example, the high-band bias current source HBC may extract the high-frequency component of the power supply voltage VDD in the form of a current, so as to be provided to the 0-th MOSFET M0. A structure of the high-band bias current source HBC will be described in detail with reference to FIG. 8. The high-band bias current source HBC is illustrated in FIG. 7 as flowing from the power supply voltage VDD to the 0-th node N0. However, the present disclosure is not limited thereto.

The 0-th MOSFET M0 may be connected between the ground node and the 0-th node N0 and may operate in response to the first voltage V1. In an embodiment, the 0-th MOSFET M0 may operate as a source follower. For example, the 0-th MOSFET M0 may include a source connected to the 0-th node N0 and a drain connected to the ground node and may generate the gate voltage VG at the 0-th node N0 as an output so as to be provided to the pass transistor unit 160. The description is given with reference to the voltage regulator 100 of FIG. 3, however, in the case of the voltage regulator 200 of FIG. 4, the 0-th MOSFET M0 may generate the second voltage V2 at the 0-th node N0 so as to be provided to the post buffer unit 280 of FIG. 4. According to the above operation of the 0-th MOSFET M0, the gate voltage VG (or the second voltage V2) where the first voltage V1 and the noise component of the power supply voltage VDD are combined may be generated.

Figure 8:
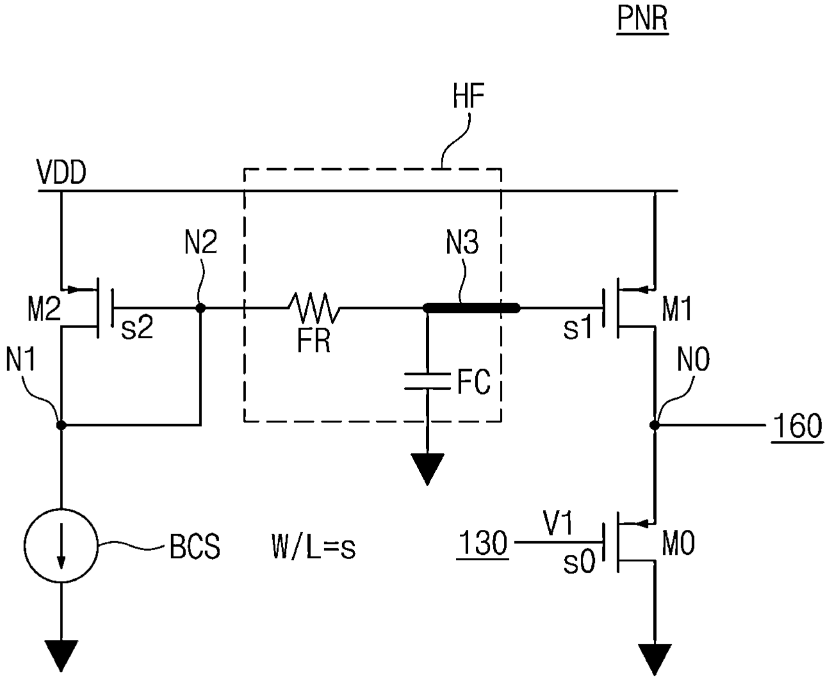
FIG. 8 is a circuit diagram illustrating a power noise replica buffer unit including a PSRR compensation circuit and a buffer of FIGS. 3 and 4, according to an embodiment of the present disclosure.

FIG. 8 is a circuit diagram illustrating the power noise replica buffer unit PNR of FIGS. 3, 4, and 7 in detail.

Referring to FIG. 8, the power noise replica buffer unit PNR may include the 0-th MOSFET M0, the first MOSFET M1, a second MOSFET M2, a bias current source BCS, a filter resistor FR, and a filter capacitor FC. The power noise replica buffer unit PNR according to an embodiment of the present disclosure will be described with reference to FIGS. 3, 4, 7, and 8.

The bias current source BCS may be connected between the ground node and a first node N1. In an embodiment, the bias current source BCS may generate a current which is the same as the current generated by the bias current generation unit 110 or 210 of FIG. 3 or 4. For example, the bias current source BCS may copy the bias current BC generated by the bias current generation unit 110 or 210 of FIG. 3 or 4 and may provide a bias current. For example, the bias current source BCS may be a current mirror which copies the current of the bias current generation unit 110 or 210 and provides a current to the first node N1.

The second MOSFET M2 may be connected between the power supply voltage VDD and the first node N1, and a gate node of the second MOSFET M2 may be connected to a second node N2. The second MOSFET M2 may have a second size s2 (hereinafter, the size of the MOSFET means a width/length (W/L) of the MOSFET). In an embodiment, the first node N1 and the second node N2 may be connected. That is, the drain node and the gate node of the second MOSFET M2 may be connected to each other. The second MOSFET M2 may be a MOSFET placed on a current source side in the current mirror.

A high-frequency filter HF may be placed between the gate node of the first MOSFET M1 and the gate node of the second MOSFET M2. In an embodiment, the high-frequency filter HF may include the filter resistor FR and the filter capacitor FC. For example, the filter resistor FR may be connected between the second node N2 and a third node N3, and the filter capacitor FC may be connected between the third node N3 and the ground node. The high-frequency filter HF described above is provided as an example, but the present disclosure is not limited thereto. For example, a circuit capable of providing a high-frequency component to an input signal of the first MOSFET M1 may be provided according to embodiments of the present disclosure.

The first MOSFET M1 may be connected between the power supply voltage VDD and the 0-th node N0, and a gate node of the first MOSFET M1 may be connected to the third node N3. The first MOSFET M1 may have a first size s1. The first MOSFET M1 may provide the high-frequency component (or noise component) of the power supply voltage VDD to the 0-th node N0 in the form of a current.

The 0-th MOSFET M0 may correspond to the 0-th MOSFET M0 of FIG. 7 and may have a 0-th size s0. Referring to FIG. 8, the second MOSFET M2 and the first MOSFET M1 may have a current mirror structure. In an embodiment, the high-frequency filter HF may be disposed between the current mirror. For example, the high-frequency filter HF may be disposed between the second node N2 and the third node N3. In an embodiment, an amplification amount of the high-frequency component may be determined based on a size ratio s1/s0 of the 0-th MOSFET M0 and the first MOSFET M1. For example, the amplification amount of the high-frequency component may increase by increasing the first size s1, with the 0-th size s0 being fixed. A result of comparing PSRR performance according to the adjustment of the 0-th size s0 and the first size s1 will be described with reference to FIG. 12.

Through the current mirror structure, the power noise replica buffer unit PNR may be simpler than that of the conventional voltage regulator. For example, the power noise replica buffer unit PNR according to an embodiment of the present disclosure does not include an auxiliary amplifier. The power noise replica buffer unit PNR may improve PSRR performance more effectively even in the high-frequency band, and through the simple structure, the power noise replica buffer unit PNR according to an embodiment of the present disclosure may provide a more convenient design and a more convenient design change.

Although the above description refers to an example with reference to FIGS. 7 and 8 in which the 0-th MOSFET M0, the first MOSFET M1, and the second MOSFET M2 are PMOS transistors, the present disclosure is not limited thereto. For example, according to embodiments of the present disclosure, the 0-th MOSFET M0, the first MOSFET M1, and the second MOSFET M2 may be implemented with an NMOS transistor capable of providing the same effect and operation, or the 0-th MOSFET M0, the first MOSFET M1, and the second MOSFET M2 may be implemented with a circuit including a plurality of MOS transistors.

FIGS. 9 to 13 are graphs illustrating frequency response characteristics of the voltage regulator 100 or 200 of FIG. 3 or 4, according to an embodiment of the present disclosure.

In an embodiment, in the graphs of FIGS. 9 to 13, the horizontal axis represents a frequency, and the vertical axis represents a gain or a PSRR characteristic. In an embodiment, FIGS. 9 to 13 show bode plots expressed in the log scale. In FIGS. 9 to 13, a to g of the horizontal axis may be positive integers sequentially increasing, and A to G of the vertical axis may be negative integers sequentially increasing in units of 10.

Figure 9:
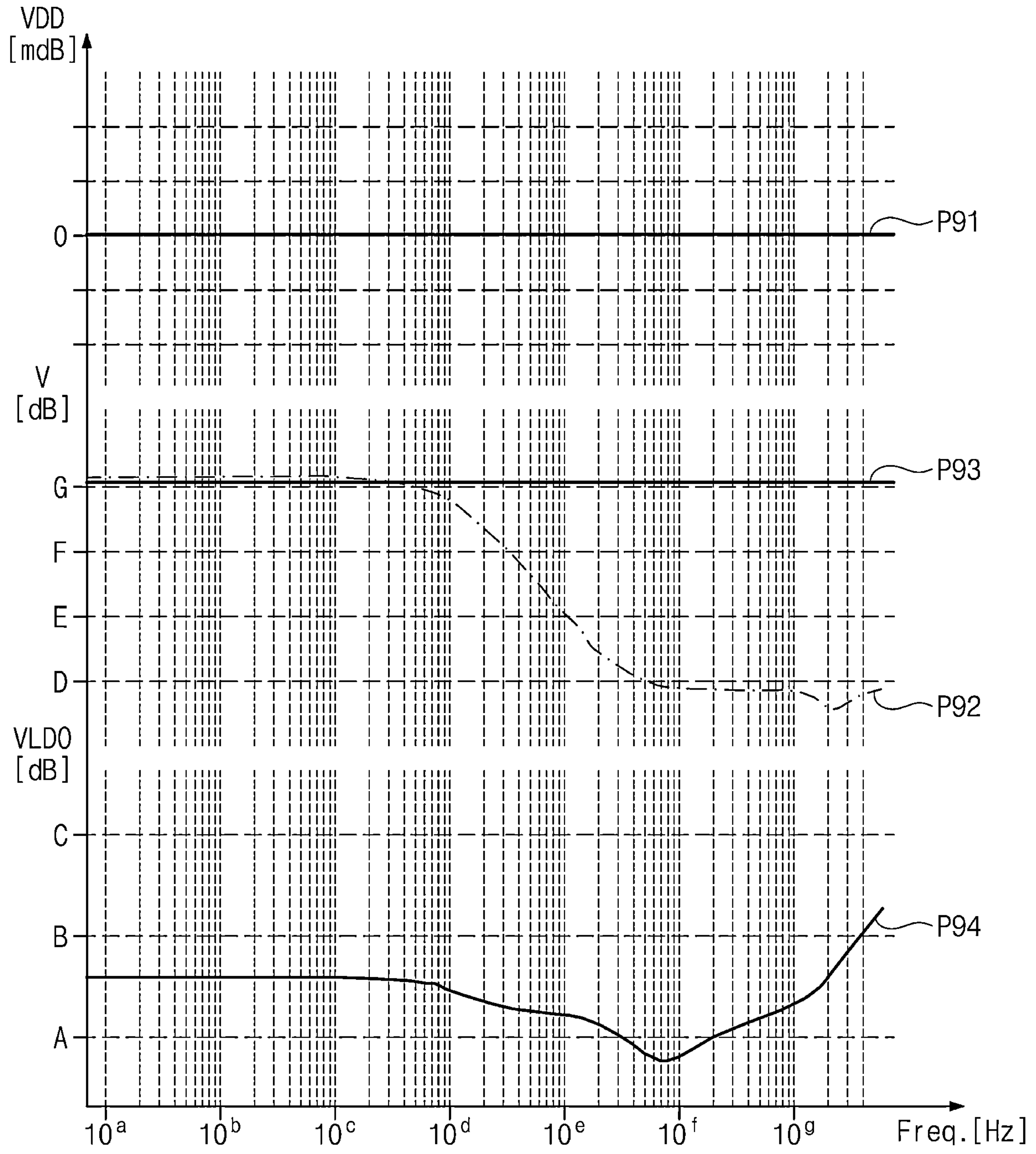
FIG. 9 is a bode plot illustrating gains of an input voltage and an intermediate voltage of a voltage regulator of FIGS. 3 and 4 and a PSRR in a log scale within a frequency spectrum, according to an embodiment of the present disclosure.

FIG. 9 illustrates gains of the power supply voltage VDD, the first voltage V1, the second voltage V2, and the gate voltage VG of the voltage regulator 200 of FIG. 4 and the PSRR characteristic of the voltage regulator 200 when a small signal (e.g., a noise) of the power supply voltage VDD is applied. Referring to FIG. 9, a first response P91 of the power supply voltage VDD, a second response P92 of the first voltage V1 of FIG. 4, a third response P93 of the second voltage V2 and the gate voltage VG of FIG. 4, and a fourth response P94 being the PSRR characteristic of the voltage regulator 200 are illustrated. The improved PSRR characteristic will be described with reference to FIG. 9.

Referring to FIG. 9, the first response P91 may indicate a response of 0 dB across the frequency spectrum. Because this indicates a gain according to a change of a signal of the power supply voltage VDD, the gain is 1.

Because the second response P92 is close to about 20 dB/dec in a specific frequency band, the gain may decrease. For example, in the second response P92, the gain may start to decrease between $10^c$ and $10^d$. For example, "a" may be 1, and thus, in the second response P92, the gain may start to decrease from about 2 kHz. The reason is that the gain provided in the comparison unit 230 of FIG. 4 decreases after an arbitrary frequency (e.g., about 2 kHz).

The third response P93 may maintain the gain of about G across the frequency spectrum. For example, when "A" is about −70, the third response P93 may indicate a response of about 0 dB. The third response P93 shows an aspect different from that of the second response P92. The reason is that the power noise replica buffer unit PNR according to embodiments of the present disclosure operates. For example, the reason is that the operation of the power noise replica buffer unit PNR cancels out the decrease in the gain of the comparison unit 130 or 230.

The fourth response P94 may indicate a PSRR response characteristic. Referring to FIGS. 2 and 9, unlike the PSRR response characteristic of FIG. 2, the fourth response P94 of FIG. 4 may maintain a uniform level across the frequency spectrum. For example, when "A" is about −70 and "a" is about 0, the PSRR characteristic coming from the fourth response P94 may have performance of about −60 dB in a 1 MHz band. The above characteristic of the fourth response P94 may come from the operation according to embodiments of the present disclosure, which suppress the noise signal to generate the third response P93.

Figure 10:
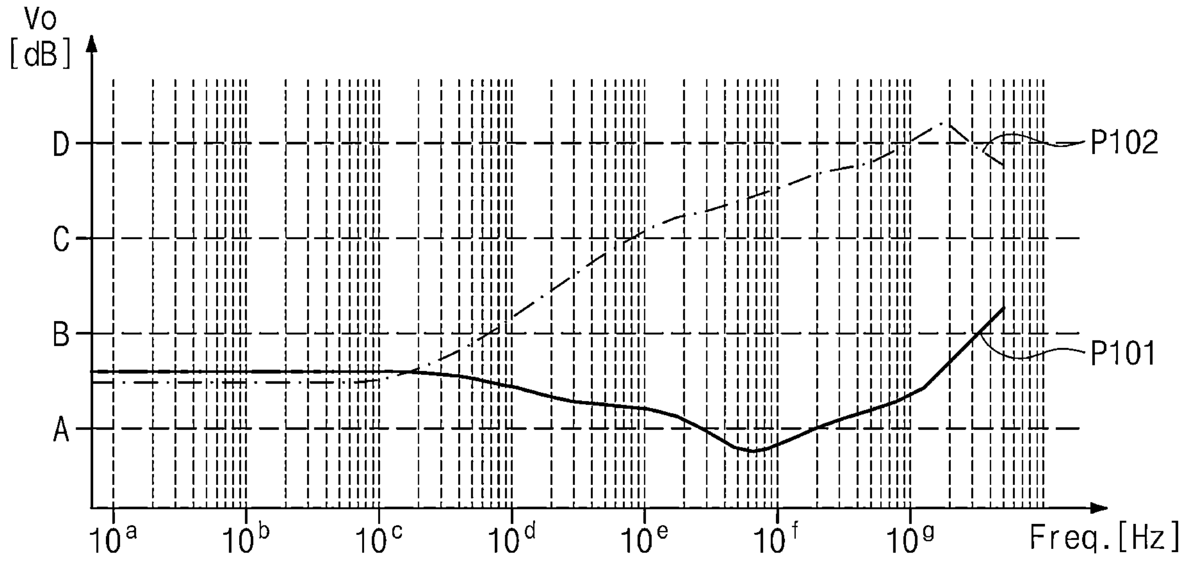
FIG. 10 is a bode plot illustrating a PSRR of a voltage regulator of FIG. 2 and a PSRR of a voltage regulator of FIGS. 3 and 4 in a log scale within a frequency spectrum, according to an embodiment of the present disclosure.

FIG. 10 shows the bode plot in which the PSRR characteristic of the conventional voltage regulator 10 (refer to FIG. 2) and the PSRR characteristic of the voltage regulator 100 or 200 (refer to FIG. 3 or 4) according to an embodiment of the present disclosure are expressed in the log scale within the frequency spectrum. The improved PSRR characteristic of the voltage regulator 100 or 200 according to an embodiment of the present disclosure will be described with reference to FIGS. 2 to 4 and 10.

Referring to FIG. 10, a first response P101 may be the PSRR characteristic of the voltage regulator 100 or 200 of FIG. 3 or 4. A second response P102 may be the PSRR characteristic of the voltage regulator 10 of FIG. 2. In an embodiment, the first response P101 may show more improved PSRR performance than the second response P102 in a relatively high frequency range. For example, the PSRR performance of the first response P101 may be improved between $10^c$ and $10^d$, compared to the second response P102. When "A" is about −80 and "a" is about 0, the voltage regulator 100 or 200 having the first response P101 may show PSRR performance of about −70 dB at 1 MHz ($10^g$). That is, unlike the PSRR illustrated in FIG. 2, in the case of the voltage regulator 100 or 200 according to an embodiment of the present disclosure, even though the gain of the reference voltage VREF decreases, the PSRR may not increase.

The bode plot of FIG. 10 shows how the PSRR characteristic of the voltage regulator 100 or 200 (refer to FIG. 3 or 4) according to an embodiment of the present disclosure changes depending on whether the structure of the bias current generation unit 110 of FIG. 5 is applied, and is expressed in the log scale within the frequency spectrum. The PSRR characteristic which is measured when the bias current generation unit 110 is applied will be described with reference to FIGS. 3 to 5 and 11.

Figure 11:
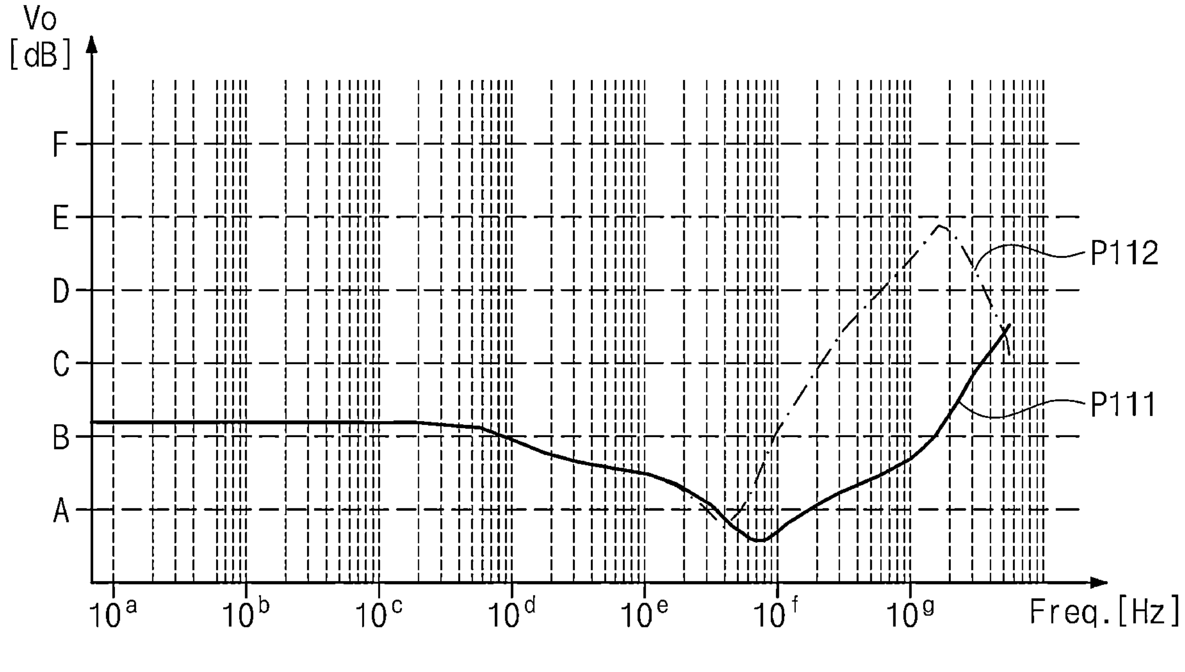
FIG. 11 is a bode plot illustrating a PSRR of a voltage regulator of FIGS. 3 and 4 using a current of a bias current generator of FIG. 5, according to an embodiment of the present disclosure.

Referring to FIG. 11, a first response P111 shows the PSRR characteristic of the voltage regulator 100 or 200 including the bias current generation unit 110 of FIG. 5, and a second response P112 indicates a response of the voltage regulator 100 or 200 not including the bias current generation unit 110 of FIG. 5. In an embodiment, the first response P111 may show more improved PSRR performance than the second response P112 in a relatively high frequency range. For example, when "A" is about −80 and "a" is about 0, the voltage regulator 100 or 200 including the bias current generation unit 110 of FIG. 5 may show PSRR performance improved as much as about 20 dB at 1 MHz, compared to the voltage regulator 100 or 200 not including the bias current generation unit 110 of FIG. 5. That is, as the bias current generation unit 110 is appropriately selected, the voltage regulator 100 or 200 may have appropriate PSRR performance.

The bode plot of FIG. 11 shows how the PSRR characteristic of the voltage regulator 100 or 200 (refer to FIG. 3 or 4) according to an embodiment of the present disclosure changes depending on the change in the size ratio of the 0-th MOSFET M0 and the first MOSFET M1 of FIG. 8, and is expressed in the log scale within the frequency spectrum. The manner in which the PSRR characteristic changes depending on the size ratio of the 0-th MOSFET M0 and the first MOSFET M1 will be described with reference to FIGS. 3, 4, 8, and 12.

Figure 12:
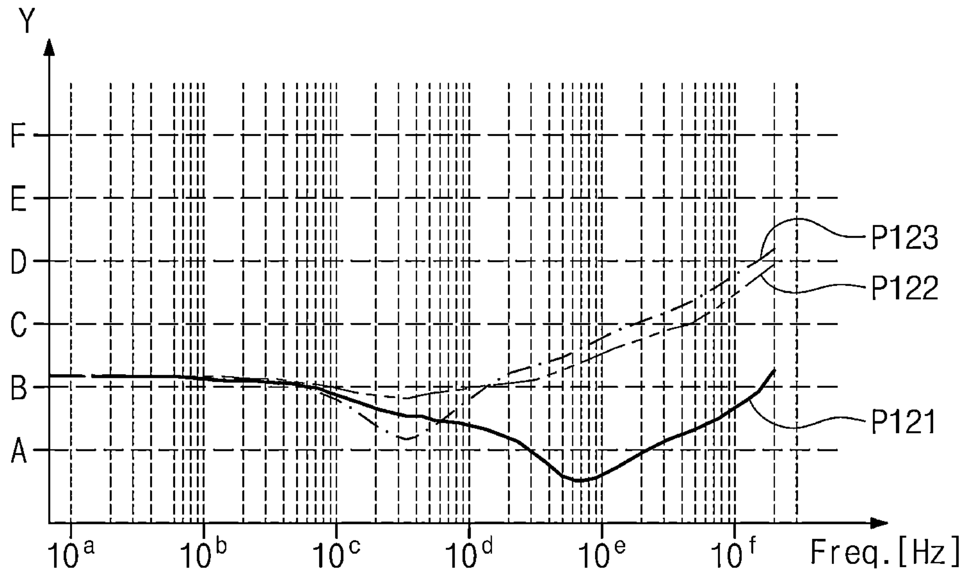
FIG. 12 is a bode plot illustrating a PSRR of a voltage regulator of FIGS. 3 and 4 according to a size ratio of a 0-th MOSFET and a first MOSFET of FIG. 7 in a log scale within a frequency spectrum, according to an embodiment of the present disclosure.

Referring to FIGS. 8 and 12, a first response P121 indicates the PSRR characteristic of the voltage regulator 100 or 200 in which the 0-th MOSFET M0 and the first MOSFET M1 have a first size ratio s1/s0, a second response P122 indicates the PSRR characteristic of the voltage regulator 100 or 200 in which the 0-th MOSFET M0 and the first MOSFET M1 have a second size ratio, and a third response P123 indicates the PSRR characteristic of the voltage regulator 100 or 200 in which the 0-th MOSFET M0 and the first MOSFET M1 have a third size ratio. Herein, the second size ratio may be about 90% of the first size ratio, and the third size ratio may be about 110% of the first size ratio. For example, when “A” is about −80 and “a” is about 0, at 1 MHz, the first response P121 may have improved PSRR performance compared to the second response P122 and the third response P123. For example, the first size ratio may be about 2.19, but the present disclosure is not limited thereto. That is, target PSRR performance may be implemented by appropriately setting the size ratio of the 0-th MOSFET M0 and the first MOSFET M1.

Figure 13:
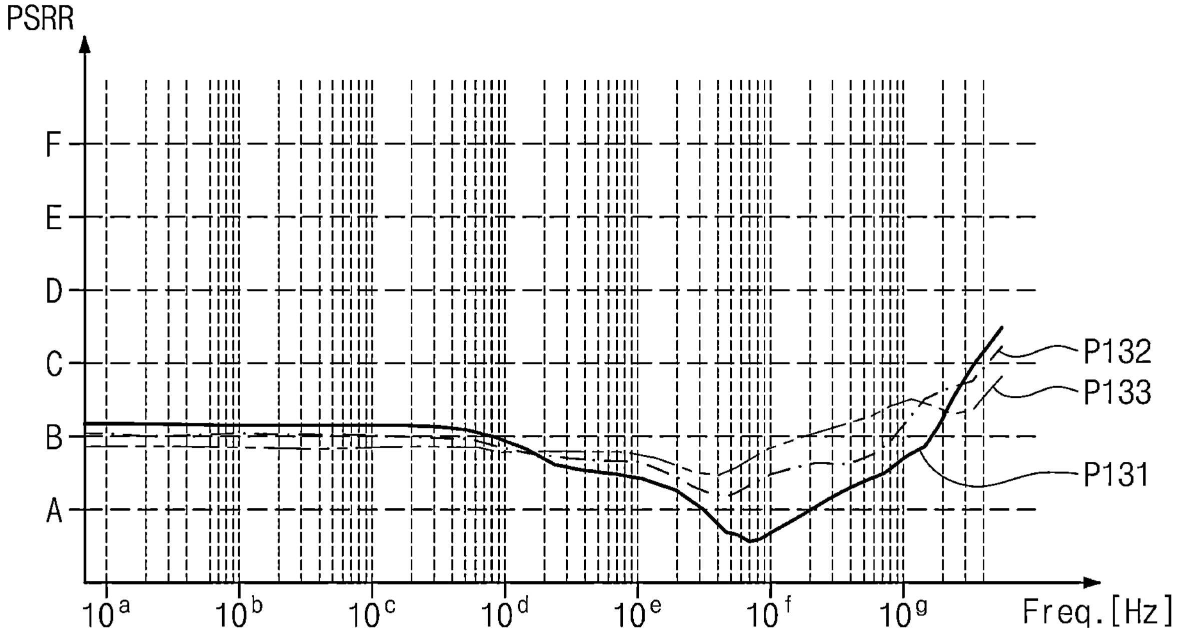
FIG. 13 is a bode plot illustrating a PSRR according to a magnitude of a load current of a voltage regulator of FIGS. 3 and 4 in a log scale within a frequency spectrum, according to an embodiment of the present disclosure.

The bode plot of FIG. 13 shows how the PSRR characteristic changes depending on the change in the magnitude of the load current IL of the voltage regulator 100 or 200 (refer to FIG. 3 or 4) according to an embodiment of the present disclosure. The PSRR characteristic, which is measured when the magnitude of the load current IL changes, will be described with reference to FIGS. 3, 4, and 13.

Referring to FIG. 13, a first response P131 indicates a response of the voltage regulator 100 or 200 having a first load current, a second response P132 indicates a response of the voltage regulator 100 or 200 having a second load current, and a third response P133 indicates a response of the voltage regulator 100 or 200 having a third load current. The magnitude of the second load current may be about 50% of the magnitude of the first load current, and the magnitude of the third load current may be about 50% of the magnitude of the second load current. For example, when “A” is about −80 and “a” is about 0, at 1 MHz, the first response P131, the second response P132, and the third response P133 may have the PSRR of about −70 dB. That is, the voltage regulator 100 or 200 according to an embodiment of the present disclosure may maintain the PSRR characteristic even in the change in the magnitude of the load current IL.

The PSRR characteristics of voltage regulators of embodiments of the present disclosure as described with reference to FIGS. 9 to 13 are provided as an example. However, the present disclosure is not limited thereto. For example, the above numerical values are provided as an example for better understanding, and the present disclosure is not limited thereto. For example, the above numerical values may be variously changed depending on the design modification. For example, numerical values may be changed depending on a power level utilized and a characteristic of a device to which the voltage regulator 100 or 200 according to an embodiment of the present disclosure supplies a power.

Figure 14:
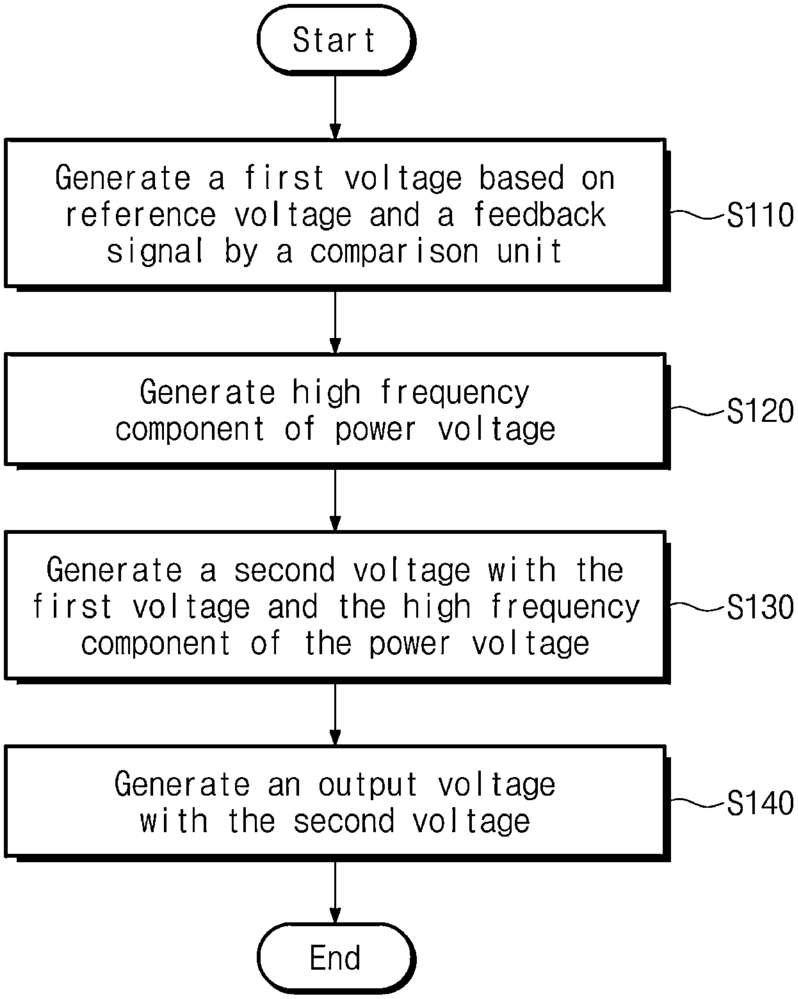
FIG. 14 is a flowchart illustrating an operation method of a voltage regulator of FIGS. 3 and 4, according to an embodiment of the present disclosure.

FIG. 14 is a flowchart illustrating an operation method of the voltage regulator 100 or 200 of FIG. 3 or 4, according to an embodiment of the present disclosure.

A process in which the voltage regulator 100 or 200 operates will be described with reference to FIGS. 3, 4, and 14. Below, for convenience of explanation, the description will be given with reference to the voltage regulator 100 of FIG. 3. However, it should be understood that the operation of the voltage regulator 200 of FIG. 4 is similar to the operation of the voltage regulator 100.

Referring to FIGS. 3 and 14, in operation S110, the voltage regulator 100 may generate the first voltage V1, based on the reference voltage VREF and the feedback signal FS. In an embodiment, the voltage regulator 100 may generate the first voltage V1 through the comparison unit 130. For example, the voltage regulator 100 may generate the first voltage V1 by comparing the reference voltage VREF and the feedback signal FS and amplifying a difference between the reference voltage VREF and the feedback signal FS, through the comparison unit 130.

In operation S120, the voltage regulator 100 may generate a high-frequency component of the power supply voltage VDD. In an embodiment, the voltage regulator 100 may generate the high-frequency component (or noise component) of the power supply voltage VDD through the PSR compensation circuit 140. For example, the voltage regulator 100 may generate the high-frequency component of the power supply voltage VDD through the high-pass filter 141 of FIG. 6 included in the PSR compensation circuit 140.

In operation S130, the voltage regulator 100 may generate a second voltage based on the high-frequency component of the power supply voltage VDD and the first voltage V1. In an embodiment, the voltage regulator 100 may generate the second voltage through the buffer 150. For example, the voltage regulator 100 may generate the second voltage by buffering the first voltage V1, based on the high-frequency component of the power supply voltage VDD, through the buffer 150. The second voltage may be the gate voltage VG of FIG. 3.

In operation S140, the voltage regulator 100 may generate an output voltage, based on the second voltage. In an embodiment, the voltage regulator 100 may generate the output voltage through the pass transistor unit 160. For example, the voltage regulator 100 may operate in response to the second voltage and may generate the output voltage at the second end of the pass transistor unit 160 whose first end is connected to the power supply voltage VDD. In an embodiment of the voltage regulator 200 of FIG. 4, the voltage regulator 200 may generate the output voltage through the post buffer unit 280 and the pass transistor unit 260. For example, the voltage regulator 200 may generate a third voltage by buffering the second voltage through the post buffer unit 280 and may generate the output voltage Vo through the pass transistor unit 260 based on the third voltage.

The above description is provided as an example, and the present disclosure is not limited thereto.

Figure 15:
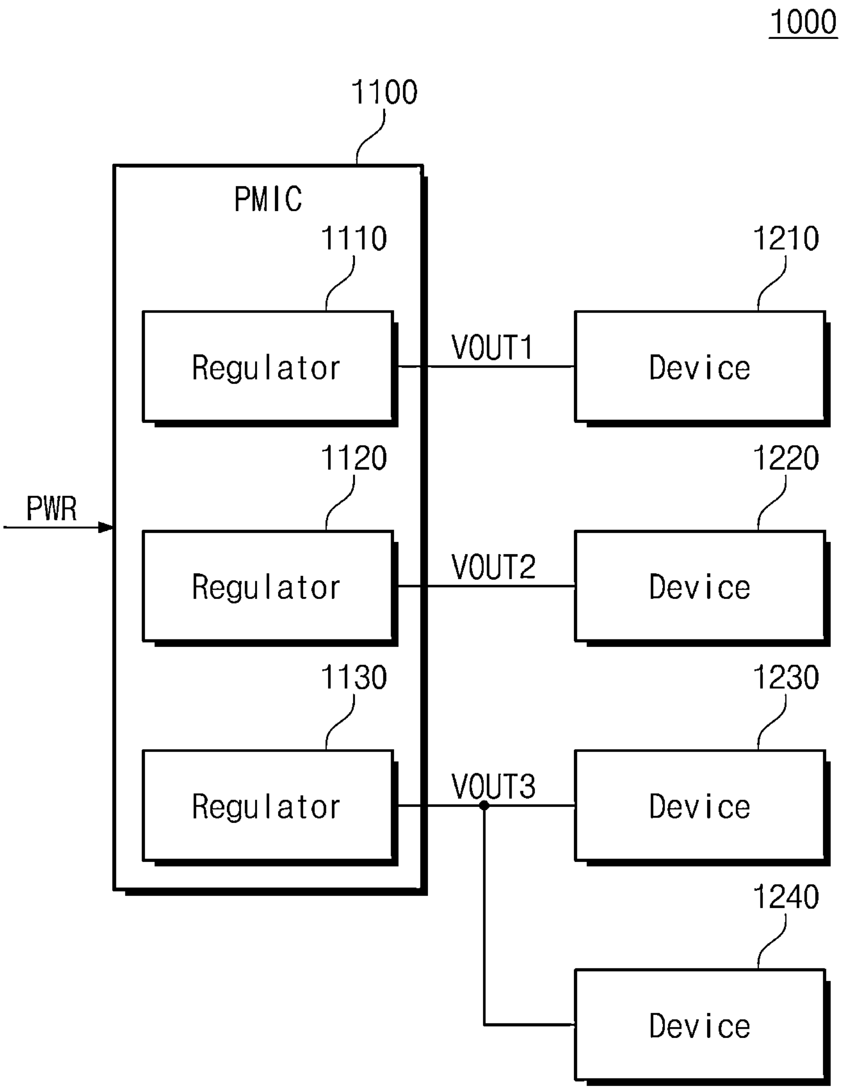
FIG. 15 is a block diagram illustrating an electronic system, according to an embodiment of the present disclosure.

FIG. 15 is a block diagram illustrating an electronic system to which a voltage regulator according to an embodiment of the present disclosure is applied.

Referring to FIG. 15, an electronic system 1000 may include a power management integrated circuit (PMIC) 1100 and a plurality of devices 1210, 1220, 1230 and 1240. In an embodiment, the electronic system 1000 may be one of various electronic devices such as, for example, a portable communication terminal, a personal digital assistant (PDA), a portable media player (PMP), a digital camera, a smartphone, a tablet computer, a laptop computer, and a wearable device. Alternatively, the electronic system 1000 may be implemented with, for example, a system-on-chip (SOC) or a system-on-package (SoP).

The power management integrated circuit 1100 may receive an external power PWR and may generate a plurality of output voltages VOUT1, VOUT2, and VOUT3 based on the external power PWR. For example, the power management integrated circuit 1100 may include a first voltage regulator 1110 configured to generate the first output voltage VOUT1, a second voltage regulator 1120 configured to generate the second output voltage VOUT2, and a third voltage regulator 1130 configured to generate the third output voltage VOUT3.

In an embodiment, each of the first to third voltage regulators 1110 to 1130 may be one of the voltage regulators 100 and 200 described with reference to FIGS. 3 to 14, or a combination of two or more thereof, or may operate based on the operation method described with reference to FIGS. 3 to 14.

The plurality of devices 1210 to 1240 may include, for example, an electronic circuit, a logic circuit, or a memory circuit configured to support various operations of the electronic system 1000. The plurality of devices 1210 to 1240 may be provided with the power from the power management integrated circuit 1100 and may operate based on the provided power. For example, the first device 1210 may receive the first output voltage VOUT1 from the power management integrated circuit 1100 and may operate based on the first output voltage VOUT1. The second device 1220 may receive the second output voltage VOUT2 from the power management integrated circuit 1100 and may operate based on the second output voltage VOUT2. Each of the third device 1230 and the fourth device 1240 may receive the third output voltage VOUT3 from the power management integrated circuit 1100 and may operate based on the third output voltage VOUT3.

In an embodiment, the first to third output voltages VOUT1 to VOUT3 may have different values or may have the same value. For example, the first output voltage VOUT1 may be identical to the second output voltage VOUT2, and the first output voltage VOUT1 may be different from the third output voltage VOUT3. In this case, the voltage regulators 1110 to 1130 may respectively generate the first to third output voltages VOUT1, VOUT2, and VOUT3, based on the size (e.g., W/L) of the pass transistor unit 160 or 260 or a structure (e.g., a CS structure or a combination of CS and SF structures) of the pass transistor unit 160 or 260.

Figure 16:
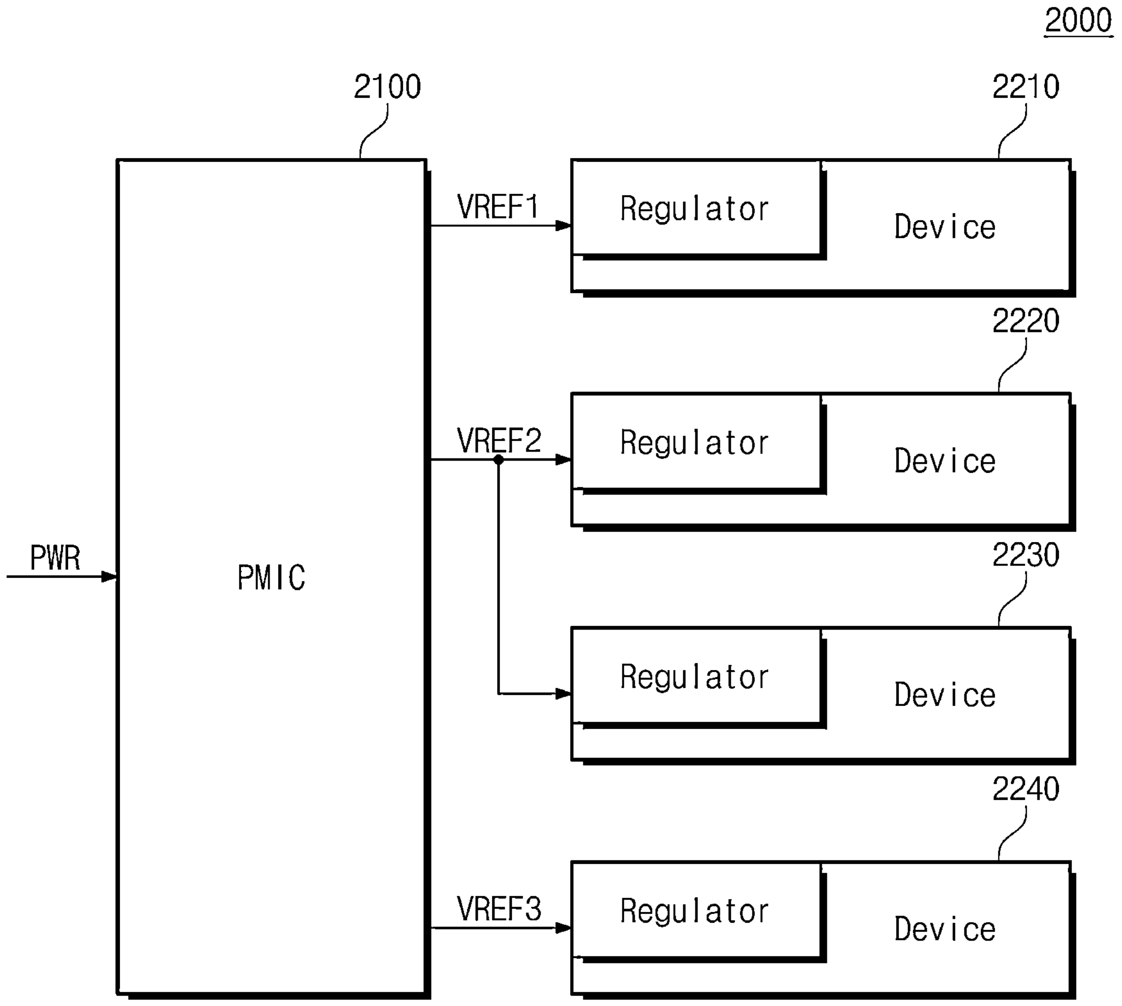
FIG. 16 is a block diagram illustrating an electronic system, according to an embodiment of the present disclosure.

FIG. 16 is a block diagram illustrating an electronic system to which a voltage regulator according to an embodiment of the present disclosure is applied.

Referring to FIG. 16, an electronic system 2000 may include a power management integrated circuit (PMIC) 2100 and a plurality of devices 2210, 2220, 2230 and 2240.

The power management integrated circuit 2100 may generate a plurality of reference voltages VREF1 to VREF3 by using the external power PWR. For example, the power management integrated circuit 2100 may generate the plurality of reference voltages VREF1 to VREF3 by using a reference voltage generator.

The plurality of devices 2210 to 2240 may receive the plurality of reference voltages VREF1 to VREF3 from the power management integrated circuit 2100 and may generate operating voltages by using the reference voltages VREF1 to VREF3. For example, each of the plurality of devices 2210 to 2240 may include a voltage regulator. The voltage regulator of the first device 2210 may generate a first operating voltage to be used in the first device 2210, based on the first reference voltage VREF1. The voltage regulator of the second device 2220 may generate a second operating voltage to be used in the second device 2220, based on the second reference voltage VREF2. The voltage regulator of the third device 2230 may generate a third operating voltage to be used in the third device 2230 based on the second reference voltage VREF2. The voltage regulator of the fourth device 2240 may generate a fourth operating voltage to be used in the fourth device 2240 based on the third reference voltage VREF3.

In an embodiment, the voltage regulator included in each of the plurality of devices 2210 to 2240 may be one of the voltage regulators described with reference to FIGS. 3 to 14, or may be a combination thereof.

In an embodiment, operating voltages which are generated by using the same reference voltage may be identical to each other. For example, the second and third operating voltages generated by the voltage regulators of the second and third devices 2220 and 2230 using the second reference voltage VREF2 may be identical to each other. Also, operating voltages which are generated by using the same reference voltage may have different levels. For example, the second and third operating voltages generated by the voltage regulators of the second and third devices 2220 and 2230 using the second reference voltage VREF2 may be different from each other. This may be variously changed or modified depending on the manner in which the voltage regulator is implemented and a level of an operating voltage utilized by each device.

Figure 17:
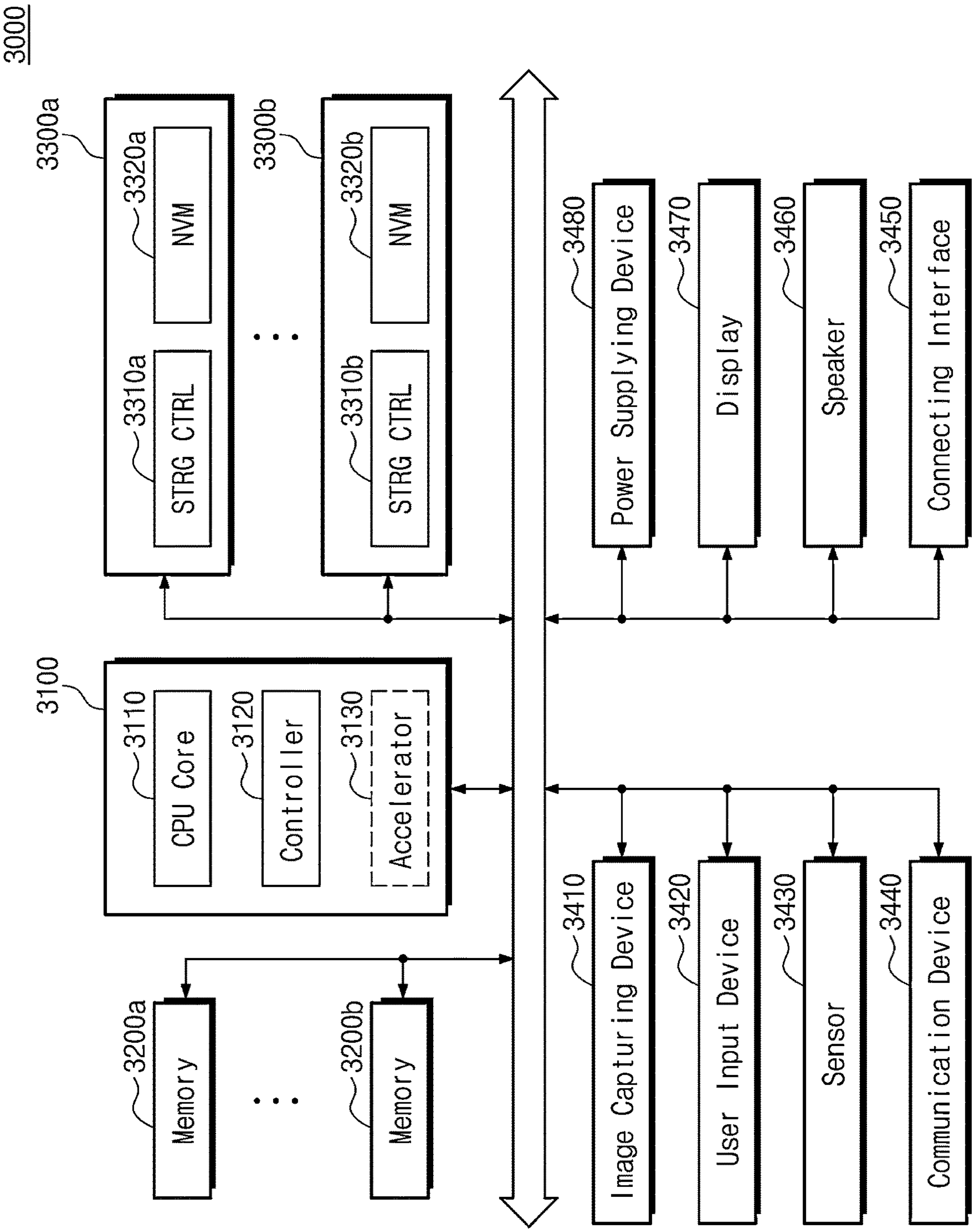
FIG. 17 is a block diagram illustrating an electronic system, according to an embodiment of the present disclosure.

FIG. 17 is a diagram of a system 3000 according to an embodiment of the present disclosure.

The system 3000 of FIG. 17 may be a mobile system, such as, for example, a portable communication terminal (e.g., a mobile phone), a smartphone, a tablet personal computer (PC), a wearable device, a healthcare device, or an Internet of Things (IOT) device. However, the system 3000 of FIG. 17 is not necessarily limited to the mobile system and may be, for example, a PC, a laptop computer, a server, a media player, or an automotive device (e.g., a navigation device).

Referring to FIG. 17, the system 3000 may include a main processor 3100, memories (e.g., 3200*a* and 3200*b*), and storage devices (e.g., 3300*a* and 3300*b*). In addition, the system 3000 may include at least one of an image capturing device 3410, a user input device 3420, a sensor 3430, a communication device 3440, a connecting interface 3450, a speaker 3460, a display 3470, and a power supplying device 3480.

The main processor 3100 may control all operations of the system 3000, for example, operations of other components included in the system 3000. The main processor 3100 may be implemented as, for example, a general-purpose processor, a dedicated processor, or an application processor.

The main processor 3100 may include at least one CPU core 3110 and further include a controller 3120 configured to control the memories 3200*a* and 3200*b* and/or the storage devices 3300*a* and 3300*b*. In some embodiments, the main processor 3100 may further include an accelerator 3130, which is a dedicated circuit for a high-speed data operation, such as an artificial intelligence (AI) data operation. The accelerator 3130 may include a graphics processing unit (GPU), a neural processing unit (NPU) and/or a data processing unit (DPU), and be implemented as a chip that is physically separate from the other components of the main processor 3100.

The memories 3200*a* and 3200*b* may be used as main memory devices of the system 3000. Although each of the memories 3200*a* and 3200*b* may include a volatile memory, such as, for example, static random access memory (SRAM) and/or dynamic RAM (DRAM), each of the memories 3200*a* and 3200*b* may also include non-volatile memory, such as, for example, a flash memory, phase-change RAM (PRAM) and/or resistive RAM (RRAM). The memories 3200*a* and 3200*b* may be implemented in the same package as the main processor 3100.

The storage devices 3300*a* and 3300*b* may serve as non-volatile storage devices configured to store data regardless of whether power is supplied thereto, and have larger storage capacity than the memories 3200*a* and 3200*b*. The storage devices 3300*a* and 3300*b* may respectively include storage controllers (STRG CTRL) 3310*a* and 3310*b* and Non-Volatile Memories (NVMs) 3320*a* and 3320*b* configured to store data via the control of the storage controllers 3310*a* and 3310*b*. Although the NVMs 3320*a* and 3320*b* may include flash memories having a two-dimensional (2D) structure or a three-dimensional (3D) V-NAND structure, the NVMs 3320*a* and 3320*b* may include other types of NVMs, such as, for example, PRAM and/or RRAM.

The storage devices 3300*a* and 3300*b* may be physically separated from the main processor 3100 and included in the system 3000 or implemented in the same package as the main processor 3100. In addition, the storage devices 3300*a* and 3300*b* may be, for example, solid-state devices (SSDs) or memory cards, and be removably combined with other components of the system 3000 through an interface, such as the connecting interface 3450 that will be described below. The storage devices 3300*a* and 3300*b* may be devices to which a standard protocol, such as, for example, a universal flash storage (UFS), an embedded multi-media card (eMMC), or a non-volatile memory express (NVMe), is applied, without being limited thereto.

The image capturing device 3410 may capture still images or moving images. The image capturing device 3410 may include, for example, a camera, a camcorder, and/or a webcam.

The user input device 3420 may receive various types of data input by a user of the system 3000 and include, for example, a touch pad, a keypad, a keyboard, a mouse, and/or a microphone.

The sensor 3430 may detect various types of physical quantities, which may be obtained from the outside of the system 3000, and convert the detected physical quantities into electric signals. The sensor 3430 may include, for example, a temperature sensor, a pressure sensor, an illuminance sensor, a position sensor, an acceleration sensor, a biosensor, and/or a gyroscope sensor.

The communication device 3440 may transmit and receive signals between other devices outside of the system 3000 according to various communication protocols. The communication device 3440 may include, for example, an antenna, a transceiver, and/or a modem. The connecting interface 3450 may provide a connection between the system 3000 and an external device, which is connected to the system 3000 and capable of transmitting and receiving data to and from the system 3000.

The connecting interface 3450 may be implemented by using various interface schemes, such as, for example, advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The speaker 3460 and the display 3470 may serve as output devices configured to respectively output visual information and auditory information to the user of the system 3000.

The power supplying device 3480 may appropriately convert a power from an embedded battery of the system 300 and/or an external power source, so as to be supplied to each component of the system 3000. In an embodiment, the power supplying device 3480 may include the voltage regulator described with reference to FIGS. 3 to 16, and may be configured to generate various operating voltages by using the voltage regulator.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to embodiments of the present disclosure, a voltage regulator with a simple structure and an improved PSRR characteristic, an electronic system including the same, and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A voltage regulator configured to generate an output voltage, comprising:

a comparison unit configured to generate a second voltage, based on a reference voltage and a first voltage generated by a feedback of the output voltage;

a power noise replica buffer unit configured to generate a third voltage including a power noise copied based on the second voltage; and a pass transistor configured to generate the output voltage in response to the third voltage, wherein the power noise replica buffer unit includes:

a 0-th transistor connected between a ground node and a 0-th node, and configured to operate in response to the second voltage;

a first transistor connected between the 0-th node and a power node and including a gate node connected to a second node;

a high-pass filter connected between the second node and a third node;

a second transistor connected between the power node and a first node connected to the third node and including a gate node connected to the third node; and a current source connected between the first node and the ground node, wherein the power noise replica buffer unit provides the third voltage through the 0-th node.

2. The voltage regulator of claim 1, further comprising:

a feedback unit configured to generate the first voltage based on the output voltage.

3. The voltage regulator of claim 2, wherein the pass transistor is connected between the power node and an output node, and wherein the feedback unit is connected between the output node and the comparison unit.

4. The voltage regulator of claim 1, wherein the current source is configured to copy a bias current generated by an external bias current generator that generates the bias current utilized for an operation of the voltage regulator.

5. The voltage regulator of claim 1, wherein the high-pass filter includes:

a resistor connected between the second node and the third node; and a capacitor connected between the second node and the ground node.

6. The voltage regulator of claim 1, further comprising:

a bias current generation unit configured to generate a bias current utilized for an operation of the voltage regulator, wherein the bias current generation unit includes:

a current generator configured to generate an initial current; and a low-pass filter configured to extract a low-frequency component of the initial current.

7. The voltage regulator of claim 6, wherein the current source is configured to copy a current which the bias current generation unit generates.

8. The voltage regulator of claim 1, wherein each of the 0-th transistor, the first transistor, and the second transistor includes a p-type metal-oxide-semiconductor field-effect transistor (P-type MOSFET).

9. A voltage regulator configured to generate an output voltage, comprising:

a comparison unit configured to generate a second voltage, based on a reference voltage and a first voltage generated by a feedback of the output voltage;

a power noise replica buffer unit configured to generate a bias signal including a noise of a power supply voltage;

a first buffer configured to generate a third voltage, based on the bias signal and the second voltage;

a second buffer configured to buffer a fourth voltage, based on the third voltage; and a pass transistor configured to generate the output voltage in response to the fourth voltage.

10. The voltage regulator of claim 9, further comprising:

a feedback unit configured to generate the first voltage based on the output voltage.

11. The voltage regulator of claim 9, wherein the power noise replica buffer unit includes:

a high-pass filter configured to filter a high-frequency component of the power supply voltage; and an amplifier configured to amplify the high-frequency component to generate the bias signal.

12. The voltage regulator of claim 9, further comprising:

a bias current generation unit configured to generate a bias current utilized for an operation of the voltage regulator, wherein the bias current generation unit includes:

a current generator configured to generate a reference current by using the power supply voltage; and a low-pass filter configured to extract a low-frequency component of the reference current based on the reference current and to generate the bias current.

13. The voltage regulator of claim 9, wherein the power noise replica buffer unit includes:

a bias current source configured to filter a high-frequency component of the power supply voltage and to generate the bias signal by amplifying the high-frequency component, wherein the first buffer includes:

a 0-th transistor connected between the bias current source and a ground node, and configured to operate in response to the second voltage.

14. The voltage regulator of claim 13, wherein the bias current source includes:

a current source connected between the ground node and a first node;

a first transistor connected between the first node and a power node and including a gate node connected to a second node, wherein the first node and the second node are connected;

a high-pass filter connected between the second node and a third node; and a second transistor connected between the power node and a 0-th node and including a gate node connected to the third node, wherein a first end of the 0-th transistor is connected to the 0-th node.

15. The voltage regulator of claim 14, wherein the high-pass filter includes:

a resistor connected between the second node and the third node; and a capacitor connected between the third node and the ground node.

16. The voltage regulator of claim 14, wherein the current source is configured to copy a current generated from an external bias current generator.

17. An operation method of a voltage regulator, the method comprising:

generating a first voltage by comparing a reference voltage and a feedback voltage of an output voltage;

receiving, by a buffer circuit, a bias signal including a high-frequency component of a power supply voltage of the voltage regulator, generating, by the buffer circuit, a second voltage, based on the first voltage and the received bias signal;

generating, by a post buffer circuit, a gate voltage based on the second voltage; and generating the output voltage, based on the gate voltage.

18. The method of claim 17, wherein the first voltage is generated by amplifying a difference between the reference voltage and the feedback voltage.

19. The method of claim 17, wherein the bias signal is generated by a power noise replica buffer unit, wherein the power noise replica buffer unit includes:

a high-pass filter configured to extract the high-frequency component of the power supply voltage of the voltage regulator; and an amplifier configured to generate the bias signal by amplifying the high-frequency component.

20. The method of claim 17, wherein the output voltage is generated by a transistor including a first end connected to a power node and configured to operate in response to the gate voltage.

* * * * *